US006967916B2

(12) United States Patent
Sano et al.

(10) Patent No.: US 6,967,916 B2
(45) Date of Patent: Nov. 22, 2005

(54) OPTICAL HEAD APPARATUS, OPTICAL INFORMATION RECORDING AND REPRODUCING APPARATUS, METHOD FOR DETECTING ABERRATION AND METHOD FOR ADJUSTING OPTICAL HEAD APPARATUS

(75) Inventors: Kousei Sano, Osaka (JP); Shin-ichi Kadowaki, Hyogo (JP); Yoshiaki Komma, Osaka (JP); Seiji Nishino, Osaka (JP); Katsuhiko Yasuda, Osaka (JP); Akihiro Yasuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 512 days.

(21) Appl. No.: 09/975,396

(22) Filed: Oct. 10, 2001

(65) Prior Publication Data

US 2002/0041542 A1    Apr. 11, 2002

(30) Foreign Application Priority Data

Oct. 10, 2000    (JP) .............................. 2000-308753

(51) Int. Cl.[7] .............................................. G11B 7/00
(52) U.S. Cl. ............................. 369/53.12; 369/112.03; 369/120
(58) Field of Search ................... 369/44.23, 44.41, 369/44.37, 53.13, 53.14, 53.19, 112.03, 112.04, 369/112.05, 112.11, 112.12, 124.03, 53.12, 369/120

(56) References Cited

U.S. PATENT DOCUMENTS

| 6,229,600 B1 * | 5/2001 | Martynov | .................... 356/123 |
| 6,399,932 B1 * | 6/2002 | Wals | ........................ 250/201.5 |
| 6,498,330 B1 * | 12/2002 | Yoshida | .................... 250/201.5 |
| 6,661,750 B2 * | 12/2003 | Saimi et al. | ............. 369/44.23 |

FOREIGN PATENT DOCUMENTS

| JP | 2000-171346 | 6/2000 |
| JP | 2000-182254 | 6/2000 |
| JP | 2001-507463 | 6/2001 |
| WO | WO 99/18466 | 4/1999 |

* cited by examiner

Primary Examiner—Paul W. Huber
(74) Attorney, Agent, or Firm—Hamre, Schumann, Mueller & Larson, P.C.

(57) ABSTRACT

An optical head apparatus capable of stably obtaining a detection signal of spherical aberration even with a high density optical disk. A spherical aberration error signal is obtained by: dividing the returning light from the optical disk into a transmitted light and a diffracted light; reproducing information with the transmitted light having a larger amount of light while dividing the diffracted light having a small amount of light into two regions, i.e., region near the optical axis and a region distant from the optical axis; determining amounts of focus deviation in respective regions as focus error signals; and taking the difference signal therebetween. Thus, it is possible to detect the amount of spherical aberration with the SN ratio of the information reproducing signal kept at high level.

15 Claims, 29 Drawing Sheets

OPTICAL HEAD APPARATUS, OPTICAL INFORMATION RECORDING AND REPRODUCING APPARATUS, METHOD FOR DETECTING ABERRATION AND METHOD FOR ADJUSTING OPTICAL HEAD APPARATUS

BACKGROUND OF THE INVENTION

1. Field of the Invention

The present invention relates to an optical head apparatus for obtaining a spherical aberration error signal to control a spherical aberration correcting means used for recording or reproducing information with respect to an information storage medium such as an optical disk or an optical card, an information recording and reproducing apparatus for recording and reproducing information with respect to an information storage medium, a method for detecting aberration, and a method for adjusting an optical head apparatus.

2. Description of the Prior Art

FIG. 28 shows a configuration of an optical head apparatus of a conventional information recording and reproducing apparatus. Light emitted from a semiconductor laser 101 as a light source is converted by a collimator lens 102 into a parallel beam of light and passes through a beam splitter 103. The beam passing through the beam splitter 103 is converged by an objective lens 105 on an optical disk 107 as an information storage medium. The converged beam is reflected and diffracted by a track on the optical disk 107. The reflected and diffracted beam passes through the objective lens 105 again, is reflected by the beam splitter 103 and is converged by a detecting lens 109. The converged beam is provided with astigmatic aberration in the 45-degree direction with respect to a track by a cylindrical lens 110 and enters a photodetector 901.

FIG. 29 is a front view of the photodetector 901 shown in FIG. 28. The photodetector 901 has detection regions 911 to 914, i.e., an upper left region, an upper right region, a lower right region and a lower left region. The beam 951 provided with astigmatic aberration is adjusted to be located in the center of the detection regions. A focus error signal can be obtained by subtracting a sum signal of signals from two detection regions located diagonally, from a sum signal of signals from two other detection regions located diagonally. Furthermore, a tracking error signal can be obtained by comparing the phase of the sum signal of signals from two detection regions located diagonally with the phase of the sum signal of signals from two other detection regions located diagonally.

In FIG. 28, an actuator 106 moves the objective lens 105 in the direction perpendicular to the track and in the focus direction. The movement in the direction perpendicular to the track is carried out by a tracking control system on the basis of the tracking error signal. The movement in the focus direction is carried out by the focus control system on the basis of the focus error signals. Herein, it is assumed that for the focus error signal generating means, the astigmatic aberration method is used and for the tracking error signal generating means, the phase differential method is used.

In order to increase the density of information recorded on the optical disk 107 as an information storage medium, there has been proposed a system in which a numerical aperture NA of the converging optical system is increased and the wavelength is shortened. However, the increase in the numerical aperture NA leads to the increase in spherical aberration generated due to the thickness error of a substrate as a protective layer of the optical disk 107. As a means for correcting this, a method for generating a spherical wave with a combination of lenses, thereby generating spherical aberration by an objective lens; and a method for generating an opposite spherical aberration with a liquid crystal are known. However, there has been no suitable method for detecting spherical aberration.

Therefore, as the density of information recorded on the information storage medium increases, the optically required condition becomes stricter, which may lead to problems in that a beam cannot be sufficiently narrowed on the information storage medium because of spherical aberration, etc. so that information cannot be recorded stably, and information cannot be reproduced stably.

SUMMARY OF THE INVENTION

With the foregoing in mind, it is an object of the present invention to provide an optical head apparatus capable of stably obtaining a detection signal of spherical aberration even with a high density optical disk, an information recording and reproducing apparatus capable of stably recording and reproducing information, a method for detecting aberration and a method for adjusting an optical head apparatus.

In order to achieve the above-mentioned object, a first optical head apparatus according to the present invention includes a light source for emitting light; a converging optical system including a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light and outputting a signal to reproduce information recorded on the information storage medium; and a second photo detector for receiving the second light and outputting a signal to detect aberration of light converged on the information storage medium.

In the first optical head apparatus, it is preferable in the first optical head apparatus that the light dividing means divides the second light into light in a first region near the optical axis and light in a second region distant from the optical axis; and the optical head apparatus includes a spherical aberration detector for detecting the amount of spherical aberration of light converged on the information storage medium by using at least one of an amount of focus deviation of light in the first region and an amount of focus deviation of light in the second region.

In this case, it is preferable that the spherical aberration detector detects the difference between the amount of focus deviation of light in the first region and the amount of focus deviation of light in the second region as a spherical aberration amount.

Furthermore, it is preferable that a cross sectional shape of light used for the converging optical system is substantially circular with a first radius, and a first region that is a concentric circle of the substantial circle and has a second radius smaller than the first radius and a second region that is outside of the first region and inside of the substantial circle with the first radius are provided.

Furthermore, it is preferable that the amount of change in the amount of focus deviation of light in the first region is equal to that in the amount of focus deviation of light in the second region when the relative distance between the information storage medium and the light converging means varies.

Furthermore, it is preferable that the second photo detector has a first photo detection region for detecting light in the first region and a second photo detection region for detecting light in the second region; and the first photo detection region is arranged in a portion nearer to the optical axis of the first light divided by the light dividing means as compared with the second photo detection region.

Furthermore, it is preferable that the second photo detector has a first photo detection region for detecting light in the first region and a second photo detection region for detecting light in the second region, and the first photo detection region and the second photo detection region partially overlap with each other.

Furthermore, it is preferable that the converging optical system includes a spherical aberration correcting means for changing the spherical aberration of light converged on the information storage medium, and the spherical aberration correcting means operates by receiving a signal from the spherical aberration detecting means.

In the first optical head apparatus, it is preferable that the information storage medium has tracks with a certain pitch, the light dividing means divides a region in which the +first order light and the zero order light diffracted by the tracks are overlapped into an inner region +1A and an outer region +1B surrounding the region +1A, and divides a region in which the first −first order light and the zero order light diffracted by the tracks are overlapped into an inner region −1A and an outer region −1B surrounding the region −1A; and the optical head apparatus further includes a tilt detecting means for detecting an amount of tilt toward the direction of tracks between the information storage medium and the converging optical system on the basis of a difference signal between a signal RT+ and a signal −RT, wherein the signal RT+ is a sum signal of signals in proportion to the amount of light in the region +1A and signals in proportion to the amount of light in the region −1B, the signal RT− is a sum signal of signals in proportion to the amount of light in the region +1B and signals in proportion to the amount of light in the region −1A.

In order to achieve the above-mentioned object, a second optical head apparatus according to the present invention includes a light source for emitting light; a converging optical system including a light converging means for converging the light emitted from the light source onto an information storage medium; a light dividing means for dividing a returning light reflected by the information storage medium into light in the first region near the optical axis and light in the second region distant from the optical axis; and one photo detector for receiving the divided light, and when the difference between the amount of focus deviation of light in the first region and the amount of focus deviation of light in the second region are used to detect a spherical aberration amount of light converged on the information storage medium, the amount of change in the amount of focus deviation of light in the first region is equal to that in the amount of focus deviation of light in the second region when the relative distance between the information storage medium and the light converging means varies.

In the second optical head apparatus, it is preferable that the cross sectional shape of light used for the converging optical system is substantially circular, and when the radius of the substantial circle is a first radius Rb, the first region is a region that is a concentric circle of the substantial circle and has a second radius Rb1 smaller than the first radius Rb, and the second region is a region that is outside of the first region and inside of the substantial circle with the first radius, and when the relative distance between the information storage medium and the optical converging means varies, the ratio of the first radius Rb to the second radius R1 is determined so that the amount of change in the amount of focus deviation of light in the first region is equal to that in the amount of focus deviation of light in the second region.

In order to achieve the above-mentioned object, a third optical head apparatus according to the present invention includes a light source for emitting light; a sub-beam generating means for generating a sub-beam from light emitted form the light source; a converging optical system including a light converging means for converging the sub-beam and a main beam other than the sub-beam onto an information storage medium; a light dividing means for dividing a returning light reflected by the information storage medium into a first light with a larger amount of light and a second light with an amount of light smaller than the amount of the first light; a first photo detector for receiving the first light and outputting a signal to reproduce information recorded on the information storage medium; a second photo detector for receiving a second light and outputting a signal to detect aberration of the light converged on the information storage medium; and a third photo detector for detecting a returning sub-beam reflected by the information storage medium; wherein the second photo detector and the third photo detector are arranged in the direction substantially perpendicular to the first photo detecting means.

In order to achieve the above-mentioned object, a fourth optical head apparatus according to the present invention includes a light source for emitting light; a converging optical system including a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light and outputting a signal to reproduce information recorded on the information storage medium; a second photo detector for receiving the second light and outputting a signal to detect aberration of the light converged on the information storage medium; and a judgement means for judging that a distance between the information storage medium and the converging optical means is in a certain range on the basis of a sum signal of signals from the first photo detector and the second photo detector.

In order to achieve the above-mentioned object, a fifth optical head apparatus according to the present invention includes a light source for emitting light; a converging optical system including a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light and outputting a signal to reproduce information recorded on the information storage medium; and a second photo detector for receiving the second light and outputting a signal to detect aberration of the light converged on the information storage medium; and the area of the detection region of the second photo detector S1 satisfies the following relationship:

$$S1 \leq 4\pi \cdot (d \cdot NA \cdot \alpha)^2 \cdot \eta s/\eta m;$$

wherein $\eta m$ denotes an amount of the first light; $\eta s$ denotes an amount of the second light; NA denotes a numerical aperture of the converging optical system; α denotes a lateral magnification of the returning path from the information storage medium to the first and second photo detector of the converging optical system; and d denotes an optical interval between two reflection surfaces of the information storage medium having a plurality of reflecting surfaces.

In order to achieve the above-mentioned object, an information recording and reproducing apparatus according to the present invention includes: an optical head apparatus including a light source for emitting light, a converging optical system including a light converging means for converging the light emitted from the light source onto an information storage medium, a light dividing means for dividing a returning light reflected by the information storage medium into a first light with a larger amount of light and a second light with an amount of light smaller than the amount of the first light, a first photo detector for receiving the first light and outputting a signal to reproduce information recorded on the information storage medium, and a second photo detector for receiving the second light and outputting a signal to detect the aberration of the light converged on the information storage medium; a movement means for relatively moving the optical head apparatus and the information storage medium; and a control means for controlling the optical head apparatus and the movement means.

In order to achieve the above-mentioned object, a method for detecting aberration according to the present invention uses a light source for emitting light; a converging optical system including a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light; and a second photo detector for receiving the second light, and the method reproduces information recorded on the information storage medium by using a signal from the first photo detector and detects the aberration of light converged on the information storage medium by using a signal from the second photo detector.

In order to achieve the above-mentioned object, a method for adjusting an optical head apparatus is provided, wherein the optical head apparatus includes a light source for emitting light; a converging optical system including a light converging means for converging light emitted from the light source onto an information storage medium; a light dividing means for dividing a returning light reflected by the information storage medium into light in a first region near the optical axis and light in a second region distance from the optical axis; a rotation mechanism for rotating the light dividing means with respect to the optical axis; a photo detector having a first photo detector for detecting light in the first region and a second photo detector for detecting light in the second region; and wherein the first photo detection region and the second photo detection region are divided by a dividing line substantially parallel to a line passing the center of the respective optical axes, and the first photo detection region is divided into a region 1A and a region 1B by the dividing line and the second photo detection region is divided into a region 2A located on the same side as the region 1A and a region 2B located in the same side as the region 1B with respect to the dividing line; and the light dividing means is adjusted so that the difference signal between a sum signal S1 of the detection signal from the region 1A and the detection signal from the region 2B and a sum signal S2 of the detection signal from the region 1B and the detection signal from the region 2A is to be zero by using a rotation mechanism.

According to the above-mentioned configuration, even with a high-density information storage medium, a detection signal of spherical aberration can be obtained stably and information can be recorded and reproduced stably.

DESCRIPTION OF THE PREFERRED EMBODIMENTS

Figure 1:
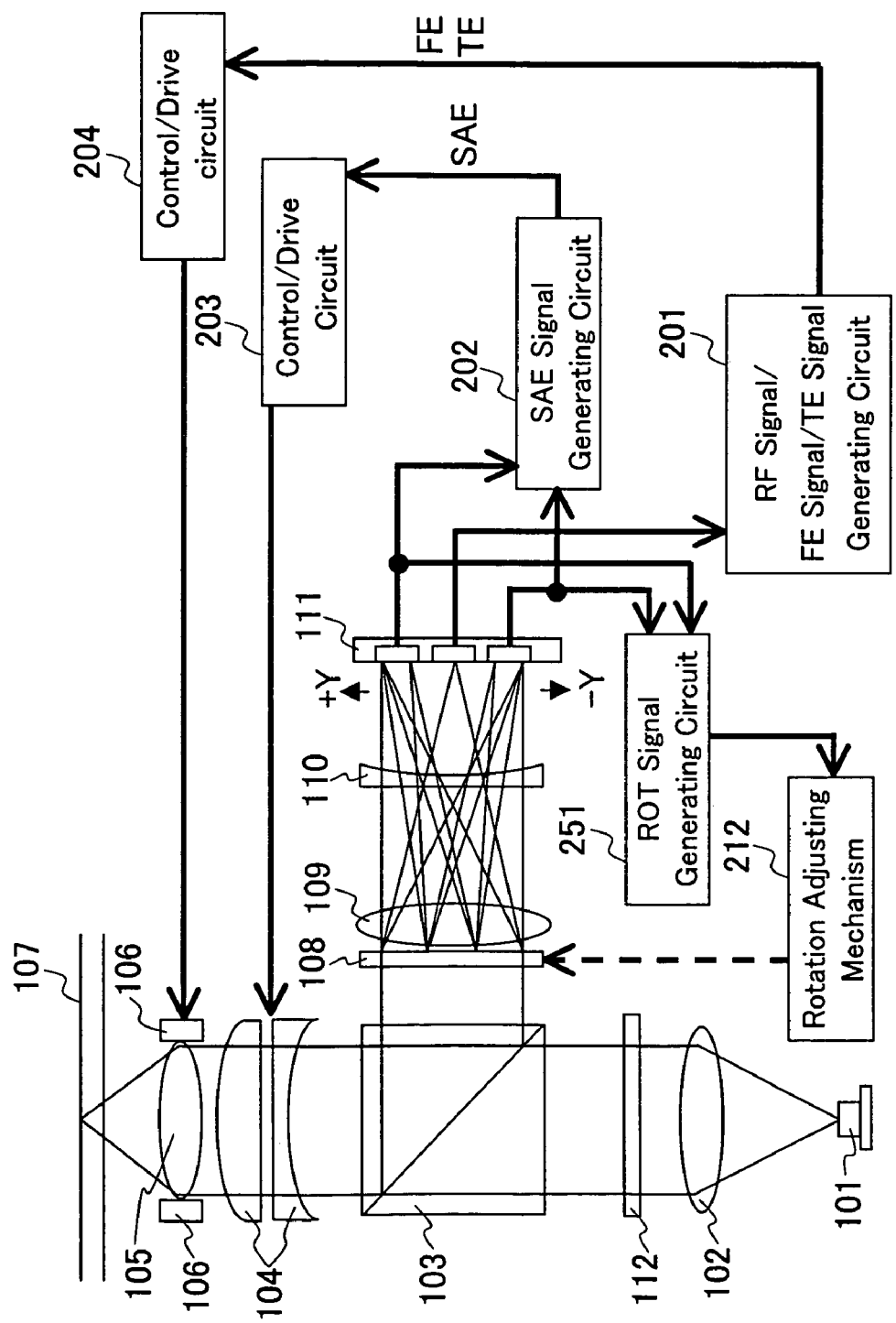
FIG. 1 is a view showing a configuration of an optical system and a circuit block diagram in an optical head apparatus according to a first embodiment of the present invention.

Hereinafter, the present invention will be explained by way of embodiments with reference to FIGS. 1 to 27. In the drawings of embodiments, the same numbers are given to elements having the same function.

(First Embodiment)

In a first embodiment of the present invention, a method of dividing a reflected light from an optical disk as an information storage medium into an inner disklike beam and an outer circumferential beam by a hologram element, and obtaining a spherical aberration error signal from a diffracted light by the hologram element and an information reproducing signal from the zero order light thereby will be mentioned.

FIG. 1 is a view showing a configuration of an optical head apparatus according to the first embodiment. In FIG. 1, light emitted from a semiconductor laser 101 as a light source is converted by a collimator lens 102 into a parallel beam of light and passes through a diffraction grating 112 as a sub-beam generating means. At this time, the ±first order diffracted light is generated by the diffraction grating 112 and thus the light is divided into three beams. Among the three beams, a beam by the zero order diffracted light in the center is referred to as a main beam, and beams by the ±first diffracted light, which are located at both sides, are referred to as sub-beams. The three beams pass through a beam splitter 103. The three beams passing through the splitter 103 whose wavefronts are converted by lens combination 104 including a concave lens and a convex lens, are converged by an objective lens 105 as a light-converging means and are focused on an optical disk 107 as an information storage medium. When the main beam is present on a track on the optical disk 107, two sub-beams are arranged so as to be in the middle between the track and neighboring tracks. The three converged beams are reflected and diffracted by a track on the optical disk 107, pass through the objective lens 105 and the lens combination 104 and are reflected by the beam splitter 103.

Further referring to FIG. 1, the three beams reflected by the beam splitter 103 are divided into the diffracted light and the zero order light by a hologram element 108 as a dividing means. The three beams, that is, the zero order light passing through the hologram element 108, are converged by a detection lens 109, are provided with astigmatic aberration in the 45-degree direction with respect to a track by a cylindrical lens 110 and then enter a photodetector 111 as a photo detecting means. After receiving these lights, signals are output from the photodetector 111 and input to a RF signal/FE signal/TE signal generating circuit 201. A RF signal output from the RF signal/FE signal/TE signal generating circuit 201 is used to reproduce information recorded on the optical disk 107, while a focus error (FE) signal and a tracking error signal (TE) are input to a control/drive circuit 204. The control/drive circuit 204 receives the FE signal and TE signal and drives the actuator 106 for the objective lens 105.

On the other hand, the +first order light and −first order light of the main beam diffracted by the hologram element 108 are also converged by the detection lens 109, are provided with astigmatic aberration in the 45-degree direction with respect to a track by the cylindrical lens 110, and enter the photodetector 111. After receiving the light, signals are output from the photodetector 111 and input to a SAE signal generating circuit 202. The SAE signal generating circuit 202 outputs a spherical aberration error signal (SAE signal). The SAE signal enters a control/drive circuit 203 to change the distance between lenses in the lens combination 104 as a spherical aberration correcting means and to control so that the spherical aberration of beams on the optical disk 107 is minimized. The hologram element 108 and the SAE signal generating circuit 202 comprise an example of a spherical aberration detecting means.

Figure 2:
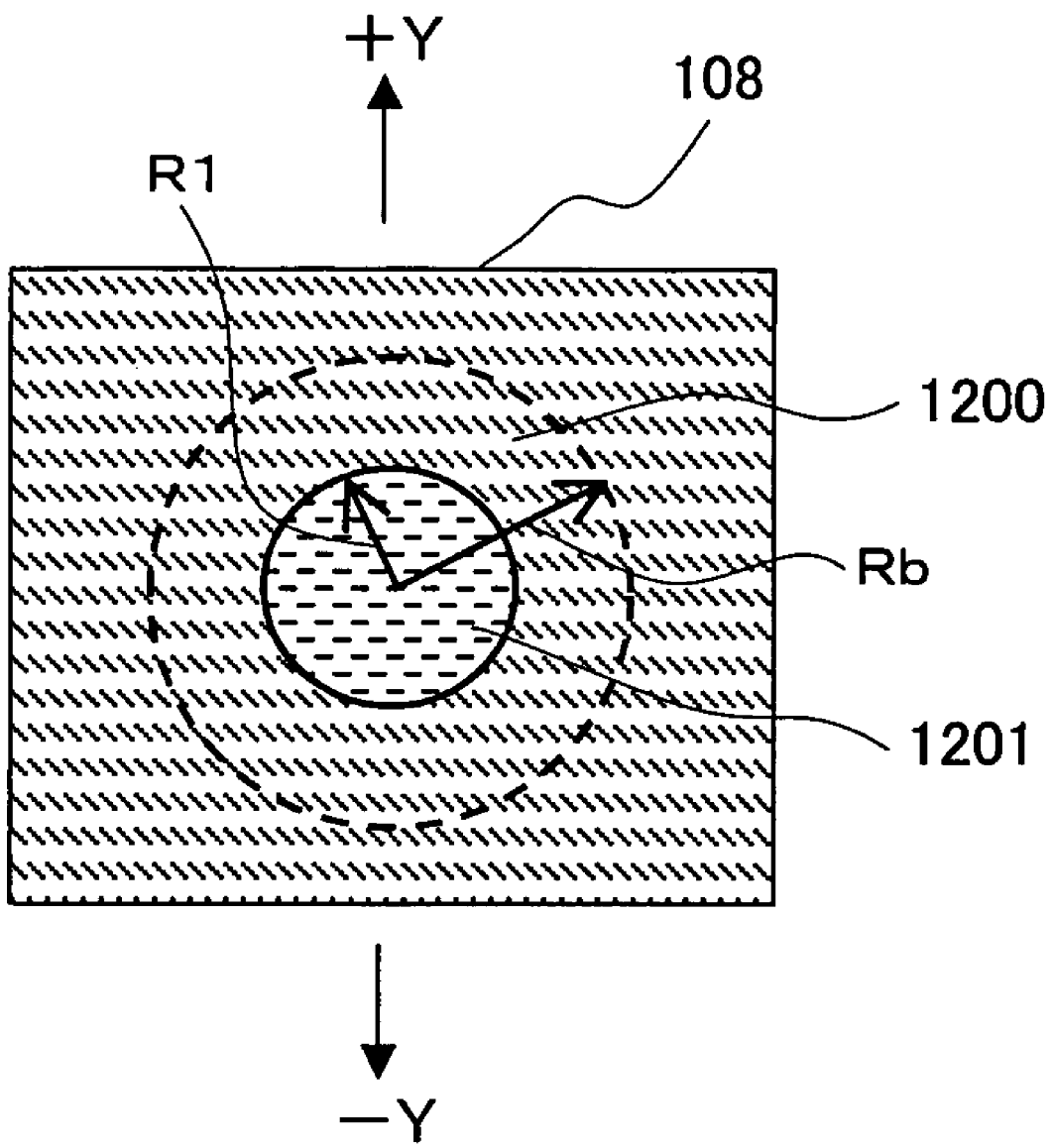
FIG. 2 is a front view showing a hologram element 108 in the first embodiment.
Figure 5:
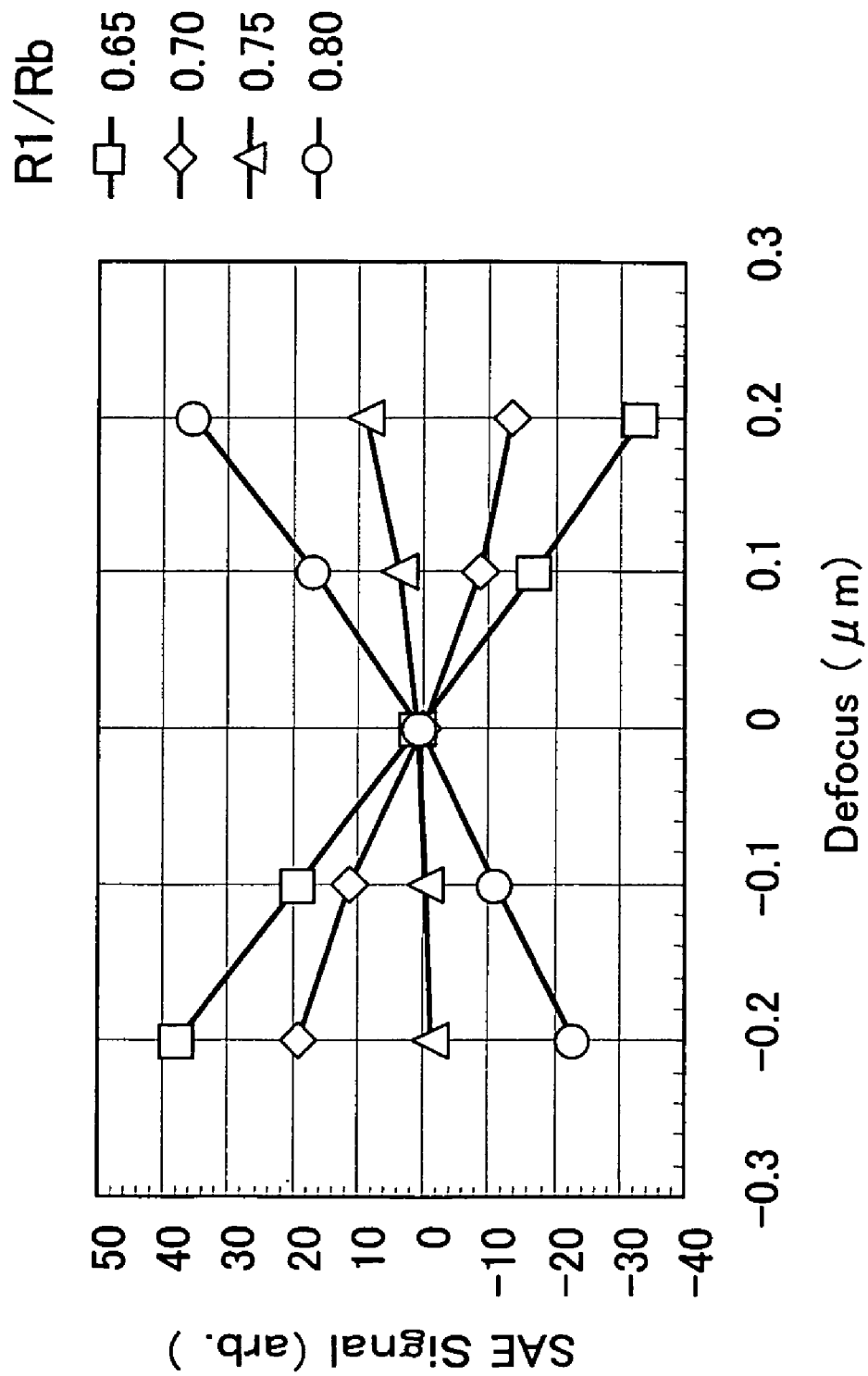
FIG. 5 is a graph showing a relationship between the change in a SAE signal and defocus in a first embodiment.

FIG. 2 is a front view of the hologram element 108. In an outer region 1200 of a circle with a radius R1 and an inner region 1201 of a circle with a radius R1, diffraction gratings having different grating intervals from each other are formed, respectively. A projection of the beam reflected and diffracted by the optical disk 107 and passing through the objective lens 105 onto the hologram element 108, corresponds to a circle with a radius Rb (a circle shown by a broken line). R1/Rb is set to be about 0.75. Thereby, the area of beam in the outer region and the area of beam in the inner region are substantially the same, and also the signal intensities of both regions are substantially the same. At this time, the detection sensitivity, that is, a degree of the change of the SAE signal with respect to the spherical aberration due to the thickness error, etc. of the optical disk 107 becomes maximum. Therefore, the optimum R1/Rb is about 0.75. FIG. 5 is a graph plotting the change of the SAE signal with R1/Rb as a parameter. FIG. 5 also shows that when R1/Rb is about 0.75, the fluctuation of the SAE signal value due to defocus becomes small. The fluctuation of the SAE signal due to defocus can be reduced by making the amount of change in a focus deviation of light in the region 1200 that is a first region and the amount of change in the focus deviation of light in the region 1201 that is a second region with respect to the change in the amount of defocus, which is a change in the relative distance between the optical disk 107 as an information storage medium and the objective lens 105. When the SAE signal value is fluctuated due to defocus, interference occurs between a servo loop of the focus control and a servo loop of spherical aberration correction control, thus making the control unstable. If R1/Rb is about 0.75, this interference is small and stable control is possible. The optimum vale of R1/Rb is dependent upon the ratio of the light intensity of the edge of the beam to that of the center of the beam. In the case where the ratio of the light intensity of the edge of the beam to that of the center of the beam is small, when R1/Rb is smaller, the interference is reduced.

Figure 3:
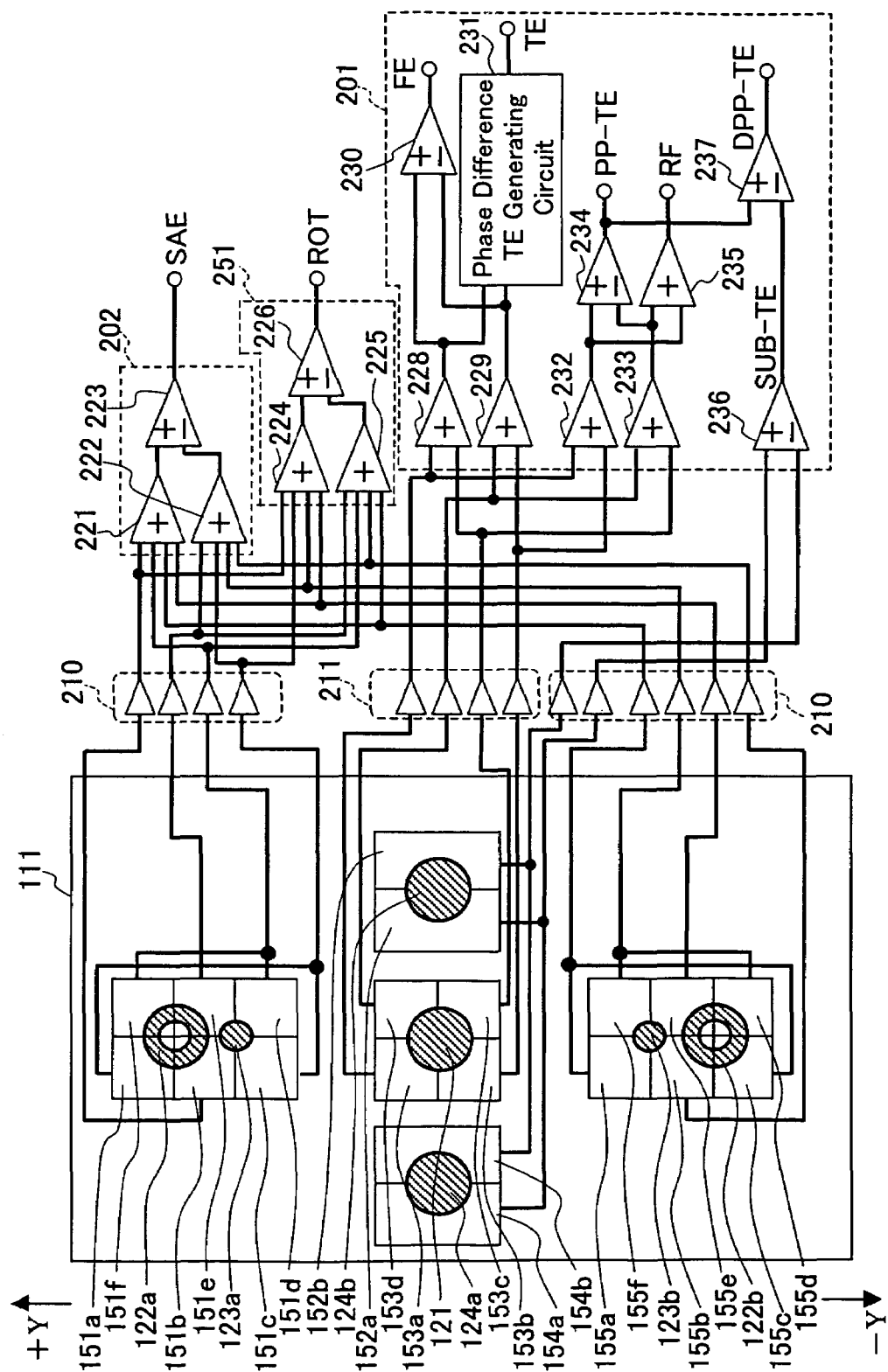
FIG. 3 is a view showing an arrangement of beams, a configuration of a photodetector 111, and a configuration of the peripheral circuit thereof in the first embodiment.
Figure 4:
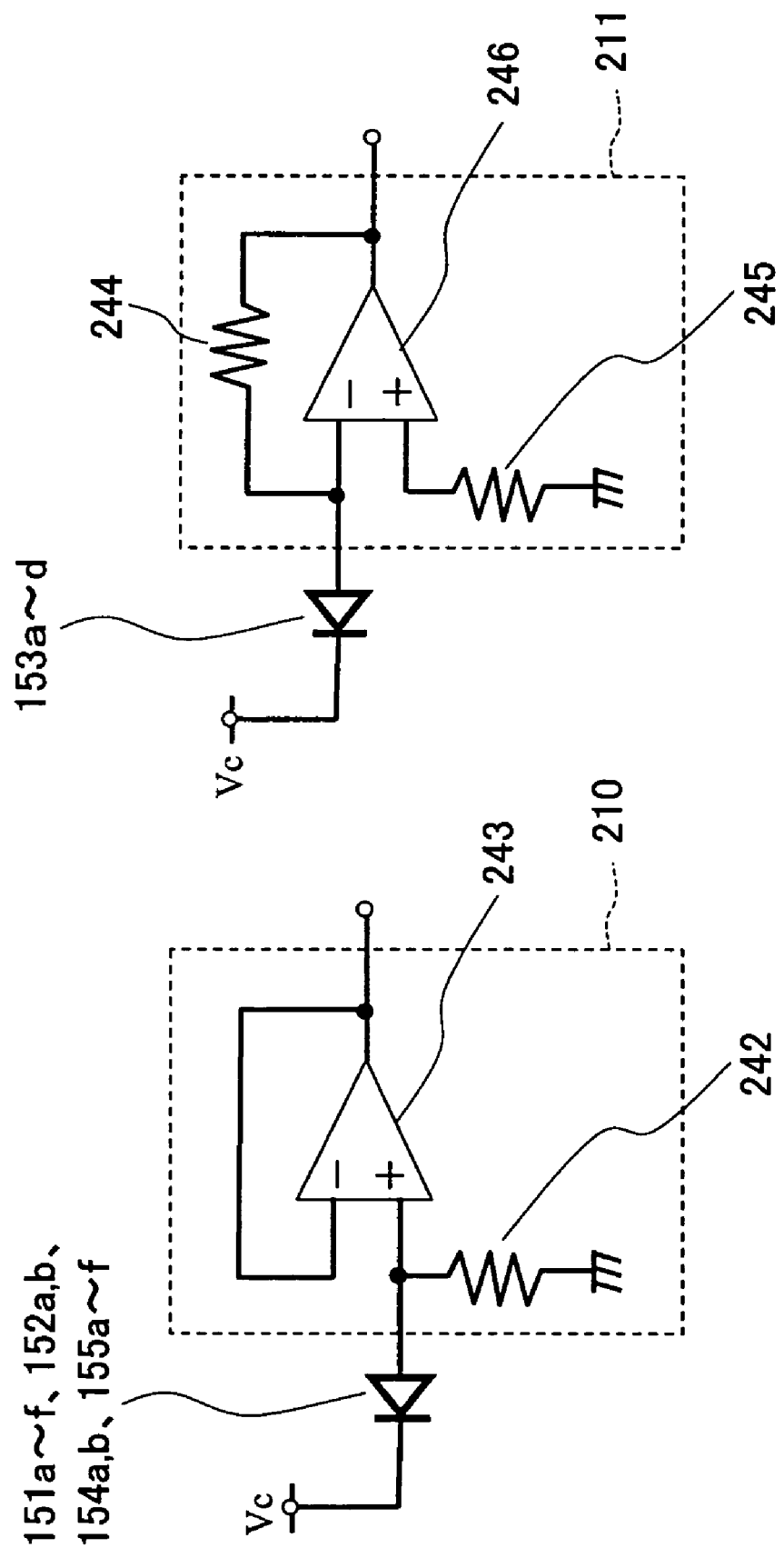
FIG. 4A is a view showing a configuration of a current-voltage conversion circuit in the first embodiment.
FIG. 4B is a view showing a configuration of another current-voltage conversion circuit in the first embodiment.

FIG. 3 is a view showing an arrangement of detection regions of the photodetector 111, and a detail configuration of the RF signal/TE signal/FE signal generating circuit 201, the SAE signal generating circuit 202, and the like. In FIG. 3, the photodetector 111 has roughly three divisional detection regions, i.e., main beam detection regions (regions 153a to 153d), and sub-beam detection regions (regions 152a to 152d and regions 154a to 154d), SAE signal detection regions (regions 151a to 151f and regions 155a to 155f). Among the main beams, a beam 121 is the zero order light passing through the hologram element 108. Among the sub-beams, beams 124a and 124b are the zero order light passing through the hologram element 108. Among the main beams, beams 122a and 122b are the +first order light and the −first order light diffracted by the region 1200 of the hologram element 108, respectively, beams 123a and 123b are the +first order light and the −first order light diffracted by the region 1201 thereof, respectively.

The detection regions 153a to 153d receive the beam 121 and outputs a current signal in accordance with the amount of the received light. A current-voltage conversion circuit 211 receives the current signal and outputs a voltage signal. An adder 228 adds signals output from the detection regions 153a and 153c arranged diagonally in the upper left, lower left, lower right and upper right detection regions. An adder 229 adds signals output from the another detection regions 153b and 153d arranged diagonally in the upper left, lower left, lower right and upper right detection regions. A differential circuit 230 receives a signal output from the adder 228 and a signal output from the adder 229 and outputs the difference signal therebetween. This is a focus error (FE) signal. A phase difference TE signal generating circuit 231 receives an output signal from the adder 228 and the adder 229 and compares the phases thereof to output a phase difference tracking error (TE) signal.

The adder 232 adds signals output from the detection regions 153a and 153b located in the left side of the upper left, lower left, lower right and upper right detection regions. The adder 233 adds signals output from the detection regions 153c and 153d located in the right side of the upper left, lower left, lower right and upper right detection regions. The differential circuit 234 receives a signal output from the adder 232 and a signal output from the adder 233 and outputs a difference signal therebetween. This is a push-pull TE signal (PP-TE). Furthermore, the adder 235 receives the output signals from the adder 232 and the adder 233 and outputs a sum signal thereof. This is a RF signal to reproduce information recorded on the optical disk 107.

Furthermore, the detection regions 152a to 152b and the detection regions 154a to 154b respectively receive sub-beams 124a and 124b and output current signals in accordance with the amount of the received light. A current-voltage conversion circuit 210 receives the current signal and outputs a voltage signal. A differential circuit 236 receives a sum signal of the output signals from the detection region 152a and the detection regions 154a and a sum signal of the output signals from the detection region 152b and the detection region 154b, and outputs the difference signal therebetween. This is a TE signal (SUB-TE) of the sub-beams. The differential circuit 237 receives the output signals from the differential circuit 234 and the differential circuit 236 and outputs the difference signals therebetween. This is a differential push-pull (DPP) method TE signal (DPP-TE). The adders 228, 229, 232, 233 and 235, the differential circuits 230, 234, 236 and 237, and the phase difference TE generating circuit 231 form the RF signal/FE signal/TE signal generating circuit 201.

Further referring to FIG. 3, the detection regions 151a to 151f receive beams 122a and 123a and output current signals in accordance with the amount of received light. The detection regions 155a to 155f receive beams 122b and 123b and output current signals corresponding to the amount of the received light. The current-voltage conversion circuit 210 receives the current signal and outputs a voltage signal. An adder 221 adds signals output from the detection regions 151b, 151d and 151f and the detection regions 155a, 155b and 155e. An adder 222 adds signals output from the detection regions 151a, 151c and 151e and the detection regions 155b, 155d and 155f. The differential circuit 223 receives the signal output from the adder 221 and the signal output from the adder 222 and outputs a difference signal therebetween. This is a spherical aberration error signal (SAE signal). The two adders 221 and 222 and the differential circuit 223 form a SAE signal generating circuit 202.

On the other hand, the adder 224 adds signals output from the detection regions 151a, 151b and 151c and the detection regions 155d, 155e and 155f. Furthermore, the adder 225 adds signals output from the detection regions 151d, 151e and 151f and the detection regions 155a, 155b and 155c. A differential circuit 226 receives the signal output from the adder 224 and the signal output from the adder 225, and outputs the difference signal therebetween. This is a rotation error signal (ROT) representing rotation displacement between the beams 122a and 122b and the detection regions 151a to 151f and between the beams 123a and 123b and detection regions 155a to 155f. The ROT signal is used to adjust the angle in the rotation direction between the hologram element 108 generating a beam for spherical aberration and the photodetector 111 when the head is adjusted. The hologram element 108 is rotated by a rotation adjusting mechanism 212 (FIG. 1). The rotation adjusting mechanism 212 receives the ROT signal that is an output signal from the ROT signal generating circuit 251 and adjusts the value of the ROT signals to be zero by rotating the hologram element 108. Thus, the hologram element 108 is set to a proper position with respect to the photodetector 111.

FIG. 4A is a view showing a configuration of a current-voltage conversion circuit 210. A reverse bias voltage Vc is applied to the respective photo detection regions 151a to 151f, 152a, 152b, 154a, 154b and 155a to 155f. A current signal Ip1 output from these photo detection regions flows through a conversion resistor 242 having a resistance value of R1. In the conversion resistor 242, a voltage drop of Ip1×R1 occurs. This voltage drop is output to the circuit of the following stage by a voltage follower composed of an operational amplifier 243. Since this configuration does not amplify the 1/f noise in the lower band that occurs in the operational amplifier, it is suitable for the current-voltage conversion circuit for a lower frequency signal.

FIG. 4B is a view showing a configuration of another current-voltage conversion circuit 211. A reverse bias voltage Vc is applied to the photo detection regions 153a to 153d. A current signal Ip2 output from these photo detection regions flows through a conversion resistor 244 having a resistance value of R2. The conversion resistor 244 also serves as a feed back resistance of an operational amplifier 246. A plus input of the operational amplifier 246 is set to a reference voltage via resistor 245. Therefore, as the output signal of the operational amplifier 246, $-Ip2 \times R2$ of voltage with respect to the reference voltage is applied to the circuit of the following stage. This configuration is suitable for the current-voltage conversion circuit for a high frequency signal, since the conversion resistor is separated from the stray capacitance of, for example, a photo detection region, even if it has a high resistance.

The following is an explanation of the allocation ratio of the amount of light to each beam. In the configuration of this embodiment, signals used up to high frequency (about several tens MHz) are limited to the signals output from the central detection regions 153a to 153d. The signals output from the detection regions 151a to 151f and the detection regions 155a to 155f are used in the frequency (about several hundreds Hz) that is about 10 times the number of rotations of the optical disk for detecting the spherical aberration and driving a spherical aberration correcting means. Therefore, as compared with a beam 121 of the zero order diffracted light of the hologram element 108, the amount of beams 122a and 122b and beams 123a and 123b of the ±first order diffracted light can be reduced and the amount of the zero order light can be increased by an amount of corresponding to the reduced amount of the ±first order diffracted light. In a recordable optical disk, the reflectance of a recording layer is lower than that of a reproducing only optical disk. Furthermore, in an optical disk having a multilayer structure in order to increase the recording capacity the substantial reflectance is further reduced. On the other hand, a small amount of light can be reproduced with high signal-to-noise ratio (SN ratio) by increasing the resistance of the conversion resistor in the current-voltage conversion circuit. However, if the conversion resistor is increased, a low-pass filter is generated between the conversion resistance and the stray capacitance of the photo detection regions, thereby making it impossible to obtain signals with high frequency. Furthermore, when some signals are added in order to obtain the RF signal, noise generated in the current-voltage conversion circuit also is added together, which may cause a reduction of the SN ratio. Taking these things into account, in order to reproduce the RF signals, it is necessary to use the largest possible amount of light and to reduce the number of the current-voltage conversion circuits. This embodiment satisfies this requirement.

As a method for detecting spherical aberration generated by, for example, a thickness error of a substrate of the protective layer, JP2000-182254A describes a method in which light in the vicinity of an optical axis is separated by a hologram element, and the focus deviation is detected from the spot size of the separated light (a spot size method). Furthermore, JP 2000-171346 A describes a method for detecting the focus deviation by separating the half circle region near the optical axis from the half circle region distant from the optical axis by a hologram element and by using the fact that the direction of half circles is changed forward and backward of the focal point (a knife edge method).

However, in any method, since the entire optical beam was divided into some sections, it was necessary to add signals obtained from the respective detection regions in order to obtain an information reproducing signal. Therefore, the number of operational amplifiers of the current-voltage conversion circuit was increased, and thus the SN ratio of the reproducing signal was reduced. In other words, in JP 2000-182254 A, since the number of the operational amplifiers is doubled, the SN ratio is deteriorated by 0.71 times. In JP 2000-171346 A, since the number of operational amplifiers is increased from three to five, the SN ratio is deteriorated by 0.77 times. Therefore, the error rate in reproducing information is increased. In this embodiment, the diffraction grating of the hologram element can be designed freely. It also is possible to make the allocation ratio of the zero order light 80% or more. Therefore, it is possible to detect spherical aberration while suppressing the drop of the SN ratio at 0.8 times or more.

In an example of this embodiment, with the spherical aberration, beams 123a and 123b of the light in the inner disklike region and beams 122a and 122b of light in the outer circumferential region are distorted in the direction that is different by 90 degrees. This distortion is caused by the astigmatic aberration provided by the cylindrical lens 110. The principle that the direction in which the beam is distorted differs depending upon the location relationship between the photodetector and the converging point is utilized also as the focus error detection of the astigmatic aberration. Based on the principle and the arrangement of beams, in each of the detection regions 151a to 151f and 155a to 155f, the output signals from the detection regions in the staggered arrangement are added and the difference signal therebetween is obtained. Thereby, the difference between the amount of the focus deviation of the beams 123a and 123b and the amount of the focus deviation of the beams 122a and 122b are determined and the spherical aberration error signal can be obtained. With this signal, by controlling the interval of lenses of the combination of lenses 104 as a spherical aberration correcting means, it is possible to keep the spherical aberration of the spot small, to record and reproduce information stably, and also to reduce the error rate.

Herein, the amount of spherical aberration is determined from the difference between the amount of the focus deviation of the beams 123a and 123b and the amount of the focus deviation of the beams 122a and 122b. However, if the defocus is zero, the spherical aberration amount can be detected with only the amount of the focus deviation of beams 123a and 123b or only the amount of the focus deviation of beams 122a and 122b.

In the configuration of this embodiment, the light in the inner disklike region is diffracted onto the side near the optical axis of the zero order light and the light in the outer circumferential region is diffracted onto the side distant from the optical axis. This is because the light in the inner disklike region hardly expands on the photodetector, and the light in the outer circumferential region expands greatly on the photodetector. The light in the outer circumferential region is located in a position distant from the optical axis where light is much affected by the positional change due to the wavelength fluctuation of the light source, variation of the focal distance of the detection lens, etc., and the light in the inner disklike region is located in the position where light is hardly affected by the positional change due to the wavelength fluctuation of the light source, etc. Thereby, even if there is fluctuation of the wavelength of light source or variation of the focal distance of the detection lens, it is possible to suppress the deterioration of the properties of the spherical aberration signal.

Furthermore, as in this configuration, in a case where the differential push-pull method (DPP method) and spherical aberration detection are carried out, as shown in FIG. 3, the sub-beam applying the DPP method and the light beam used for detecting spherical aberration are disposed in the direction substantially perpendicular to the zero order light of the main beam. Thereby, it is possible to minimize the interference between the sub-beam applying the DPP method and the light beam used for detecting spherical aberration. Herein, the case where the sub-beam is used for the DPP method is explained, however, in the case where the sub-beam is used for the tracking of the 3-beam method, by using this arrangement, the effect of minimizing the interference can be obtained.

Furthermore, as in this configuration, in the case where the light in the inner disklike region and the light in the outer circumferential region are aligned to detect, two outer detection regions for detecting light in the inner disklike region and two inner detection regions for detecting light in the outer circumferential regions can be shared with each other. Thereby, it is possible to reduce the number of the detection regions, thus simplifying and miniaturizing the detection region. As a result, an optical head apparatus can be miniaturized.

Figure 6:
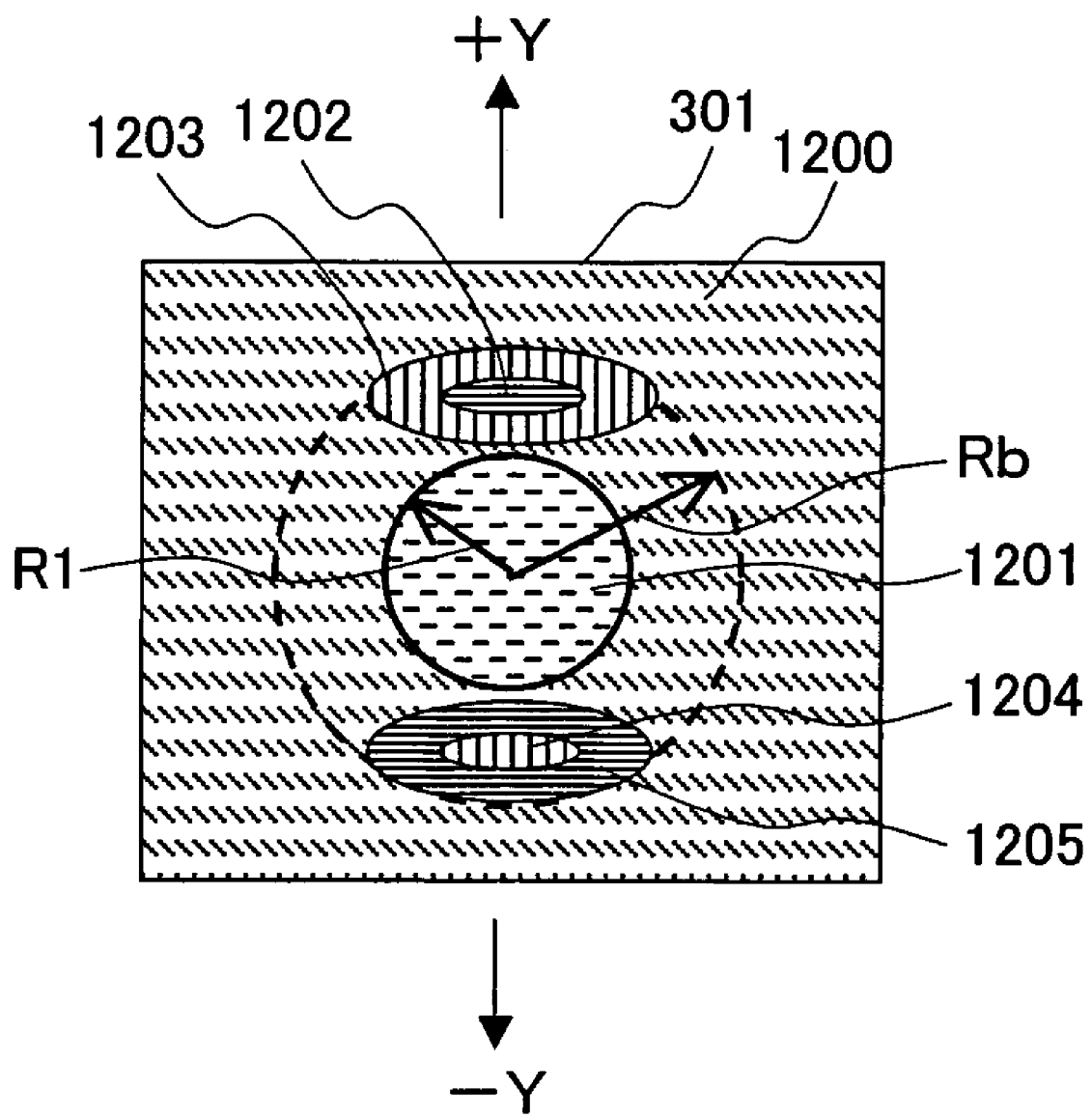
FIG. 6 is a front view showing another hologram element 301 in the first embodiment.

The following is an explanation of the method for also detecting a radial tilt by using a hologram element 301 shown in FIG. 6 instead of the hologram element 108. In the hologram 301, regions 1202 to 1205 are provided in accordance with the two regions where the ±first order diffracted light, which are diffracted by the track of the optical disk, are overlapped onto the original zero order light beam and a part of light passing through the regions 1202 to 1205 is diffracted to the different places, respectively. The region 1202 is disposed at the inside of the region 1203, and the region 1204 is disposed at inside of the region 1205.

Figure 7:
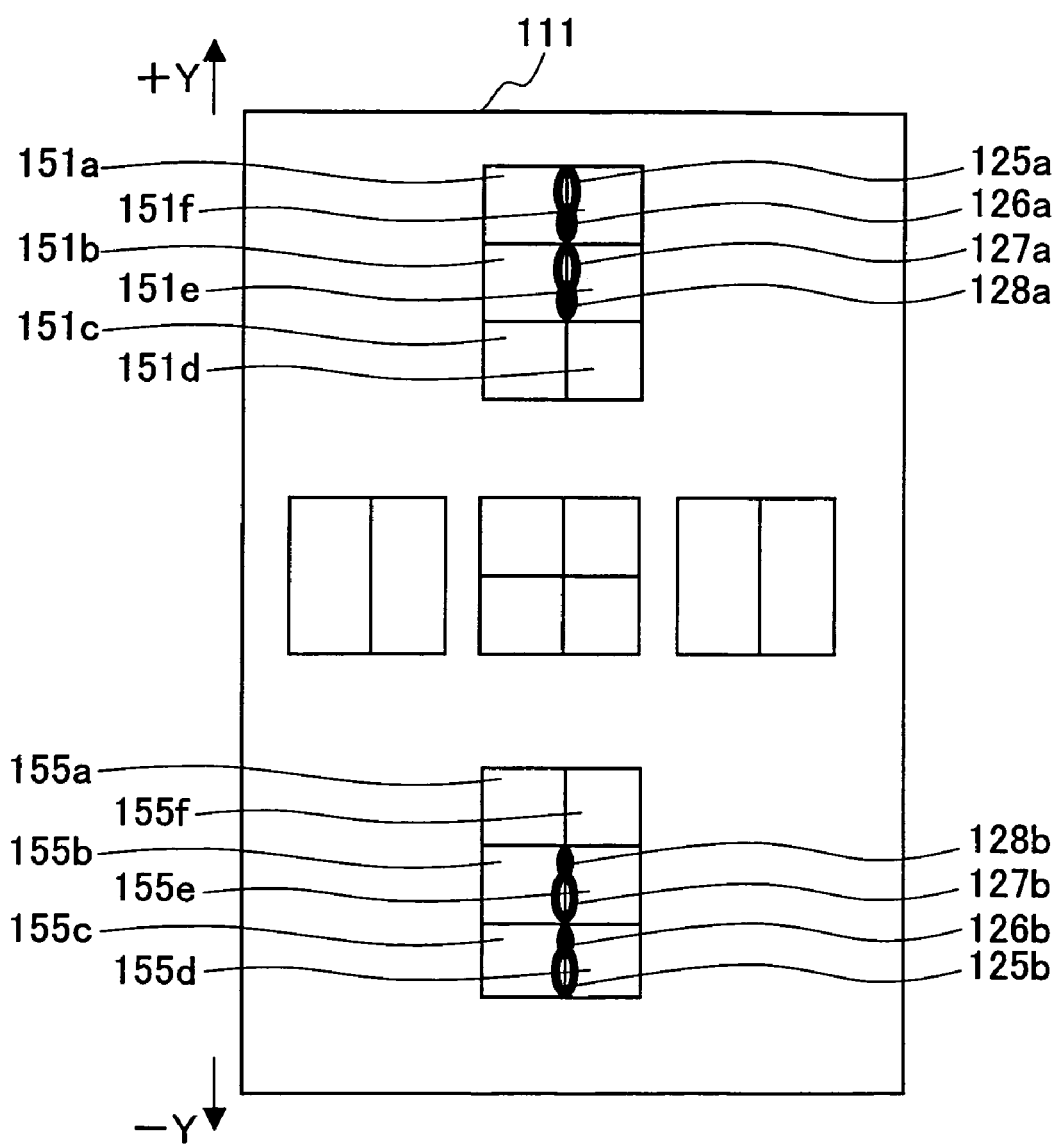
FIG. 7 is a view showing a configuration of a photodetector 111 and an arrangement of a part of the beams when another hologram element 301 is used in the first embodiment.

FIG. 7 shows the location on the photodetector of the light diffracted by these regions. Light beams 126a and 126b are the diffracted light from the region 1202, light beams 127a and 127b are the diffracted light from the region 1203, light beams 128a and 128b are the diffracted light from the region 1204, and light beams 125a and 125b are the diffracted light from the region 1205. By the operation of signals, a sum signal RT1 of the output signals from four detection regions and a sum signal RT2 of the output signals from the other four detection regions can be obtained. The sum signal RT1 is represented by: RT1=signal (151a)+signal (151f)+signal (155c)+signal (155d), and the sum signal RT2 is represented by: RT2=signal (151b)+signal (151e)+signal (155b)+signal (155e). Thus, the radial tilt error signal RTE can be obtained by taking the difference between RT1 and RT2.

The presence of the radial tilt makes the wavefront to be N-shaped. When the ±first order light diffracted by the track of the optical disk 107 is overlapped onto the zero order light and interferes therewith, in the interference region of the +first order light and the zero order light, for example, if the positive radial tilt is present, the light intensity around the center is increased, and the light intensity in the peripheral portion is decreased. On the contrary, if the negative radial tilt is present, the light intensity around the center is reduced, and the light intensity in the peripheral portion is increased. On the other hand, in the interference region of the −first order light and the zero order light, if, for example, if the positive radial tilt is present, the light intensity around the center is reduced and the light intensity around the peripheral portion is increased. On the contrary, if the negative radial tilt is present, the light intensity around the center is increased and the light intensity around the peripheral portion is reduced. Therefore, by taking the difference between a sum signal of output signals from the vicinity of the center of the interference region in the +first order side and output signals from the peripheral portion of the interference region in the −first order side and a sum signal of output signals from the vicinity of the center of the interference region in the +first order side and output signals from the peripheral portion of the interference region in the −first order side, it is possible to detect radial tilt including the polarity. By carrying out the tilt correction on the basis of the radial tilt error signal, the comatic aberration of the spot is kept small. Thus, recording and reproducing of information can be carried out stably and the error rate can be lowered.

Furthermore, in this embodiment, by adding signals from the detection regions 151a to 151f, the detection regions 155a to 155f and the detection regions 153a to 153d, it is possible to obtain an approach detection signal for detecting that the distance between the optical disk 107 and the objective lens 105 approaches to a certain distance around the just focus. It is possible to detect the approach only from the sum signal of output signals from the detection regions 153a to 153d (main PD). However, in the case where, for example, the longitudinal magnification of a detection system is high, the signal changes at high speed and secure detection cannot be carried out. Therefore, by adding the sum signal from the main PD and a sum signal of output signals from the detection regions 151a to 151f and 155a to 155f for detecting the spherical aberration (PD for SAE=SAE_PD), the ratio of the signal change with respect to the defocus is reduced, thus the detection can be carried out securely. The means for judging the approach detection is not particularly shown, however, the approach is judged based on the polarity of the difference obtained by comparing the sum signal with the predetermined detection level. This usually is carried out in a controller such as a microcomputer for control.

Figure 8:
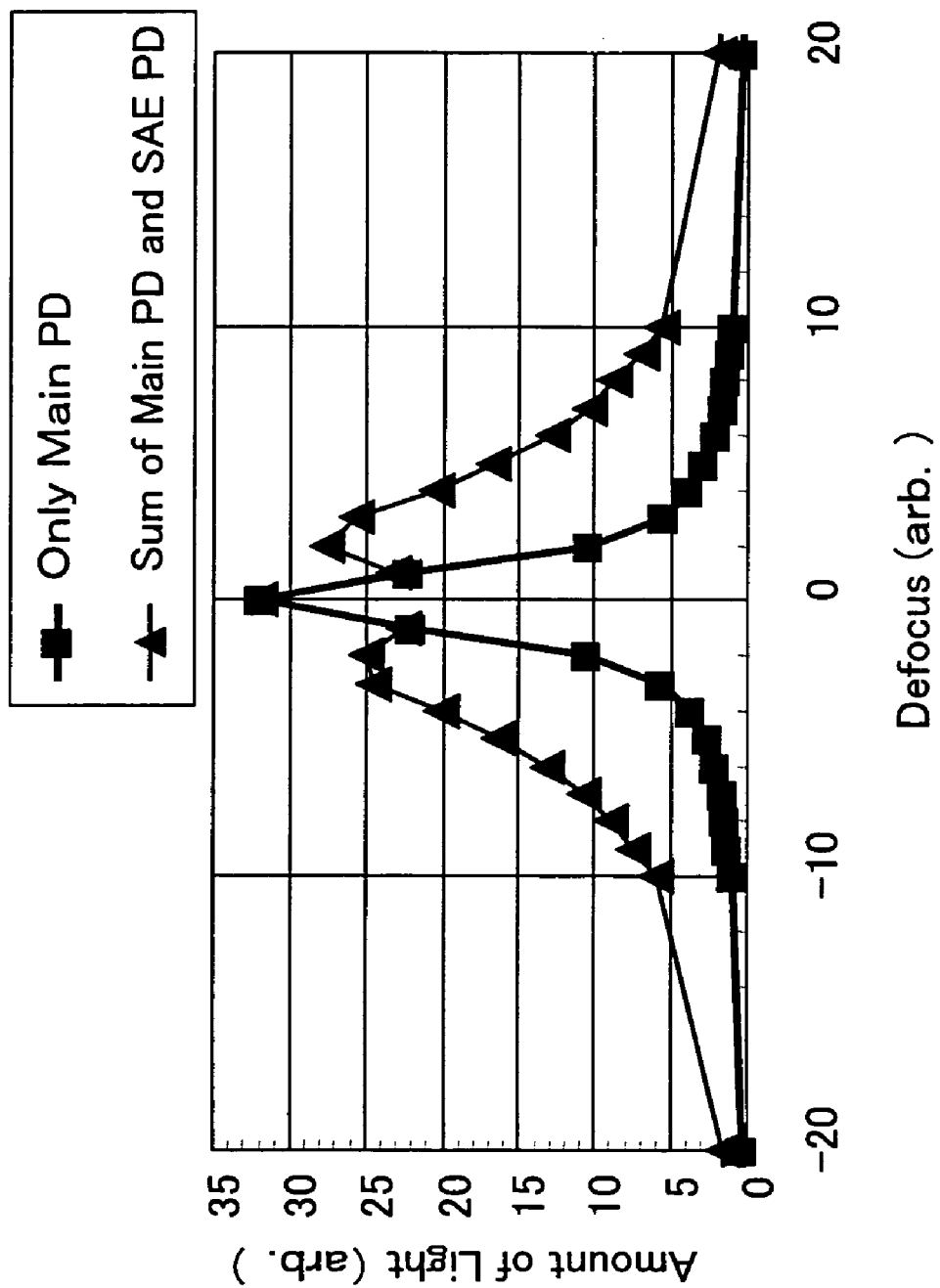
FIG. 8 is a graph showing signals obtained when focus is deviated in the first embodiment.

FIG. 8 shows the relationship between the defocus and the change of signal in the above-mentioned two cases. As shown in FIG. 8, as compared with the case of only main PD, in the case where the sum of main PD and the SAE PD is taken, the range of signals expands by about triple. Therefore, secure approach detection can be possible. Also, in the case where the objective lens 105 is allowed to approach to the optical disk 107 when focusing onto the optical disk 107 is conducted, it is possible to detect securely that the objective lens 105 has approached to the optical disk 107. Thus, the possibility of damaging the optical disk 107 because of the collision of the objective lens 105 into the optical disk 107 is reduced.

Figure 9:
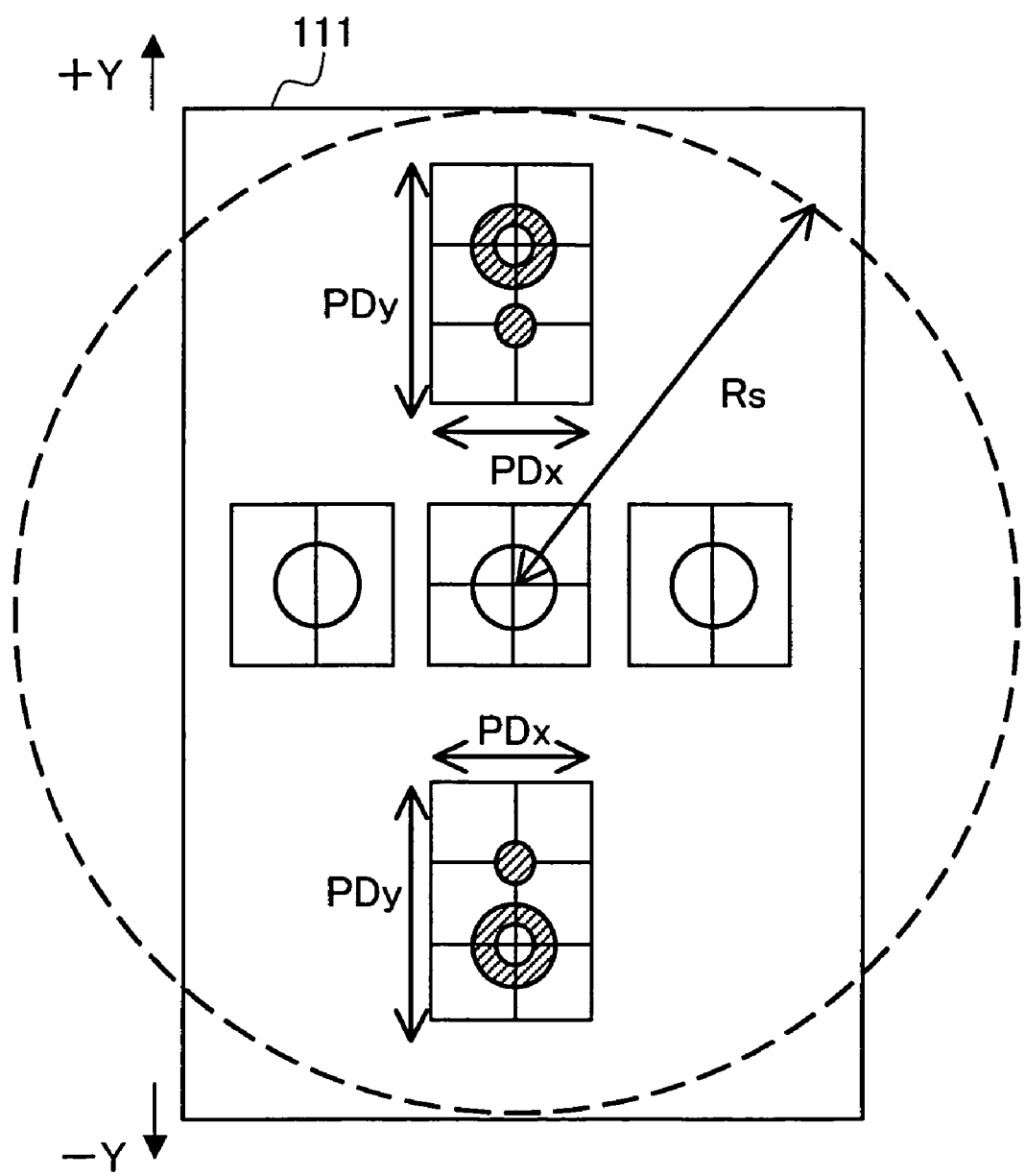
FIG. 9 is a view showing a configuration of light reflected by the other information layer and a photodetector in the first embodiment.

Furthermore, in the optical disk 107, which is a two-layered disk including two layers for recording information, when the focus control is carried out so that the light from the objective lens 105 is focused on one of the recording layers, a part of the light is reflected by the other layer. The light reflected by the other layer is detected in a state of a beam that is defocused and expands on the photodetector. This state is shown in FIG. 9. FIG. 9 shows only the state in which the zero order light of the main beam reflected by the other layer is defocused. Actually, though light in accordance with the ±first order light of the other sub-beams or main beam is detected in the defocused state, since the light amount thereof is smaller than the zero order light at the main beam, only the zero order light at the main beam of the main beam is taken into account.

The zero order light of the main beam which is reflected by the other layer expands in a substantially circular shape. The radius Rs of the circle is expressed by the following relationship:

$$Rs = 2 \cdot d \cdot NA \cdot \alpha;$$

wherein d denotes an optical interval between two layers of the disk, NA denotes a numerical aperture at the side of the information storage medium of the converging optical system, and a denotes a lateral magnification of the returning path from the converging optical system to the photodetector. This light reflected by the other layer has the inconsistency in the amount of light depending upon the locations, so that the displacement of the light on the photodetector due to the lens shift, tilt of the disk or the like gives errors to the spherical aberration error signal. This inconsistency in the amount of light is about several % of the total amount of light. If the amount of light reflected by the other layer and the amount of light for essential detection are substantially the same, the effect of the inconsistency on the spherical aberration signal is about several %. Therefore, when the area of the detection region of the photodetector for obtaining the spherical aberration signal is S1 (=2PDx·PDy), S1 can satisfy the following relationship:

$$S1 \leq \pi \cdot Rs \cdot Rs \cdot \eta s/\eta m;$$

that is, $$S1 \leq 4 \cdot \pi \cdot (d \cdot NA \cdot \alpha)^2 \cdot \eta s/\eta m;$$

wherein ηs denotes an amount of light used for detecting spherical aberration; and ηm denotes an amount of light of the zero order light of the main beam. In the optical system satisfying the above mentioned relationship, even if the light is reflected by the other layer, the errors given to the spherical aberration error signal is small, and thus it is possible to read out and record information correctly.

Herein, the two-layered structure is taken as an example, the same effect can be expected by the use of the structure including three or more layers.

In this embodiment, as a method for obtaining the amount of the focus deviation of the diffracted light, the generation of FE signals by the astigmatic aberration method is employed, however, the spot size method or the knife-edge method can be employed as well. In this case, the shape of the spot is distorted by the effect of the cylindrical lens giving astigmatic aberration. However, the astigmatic aberration generated by the cylindrical lens is cancelled by designing the shape of detection region corresponding to the distortion or by providing the diffracted light with astigmatic aberration by the hologram element. Furthermore, if the focus error detection method other than the astigmatic aberration method is used, the spherical aberration detection by using the spot size method, single knife-edge method, double knife-edge method or the like, can be carried out without considering the distortion of the shape of the spot.

Figure 10:
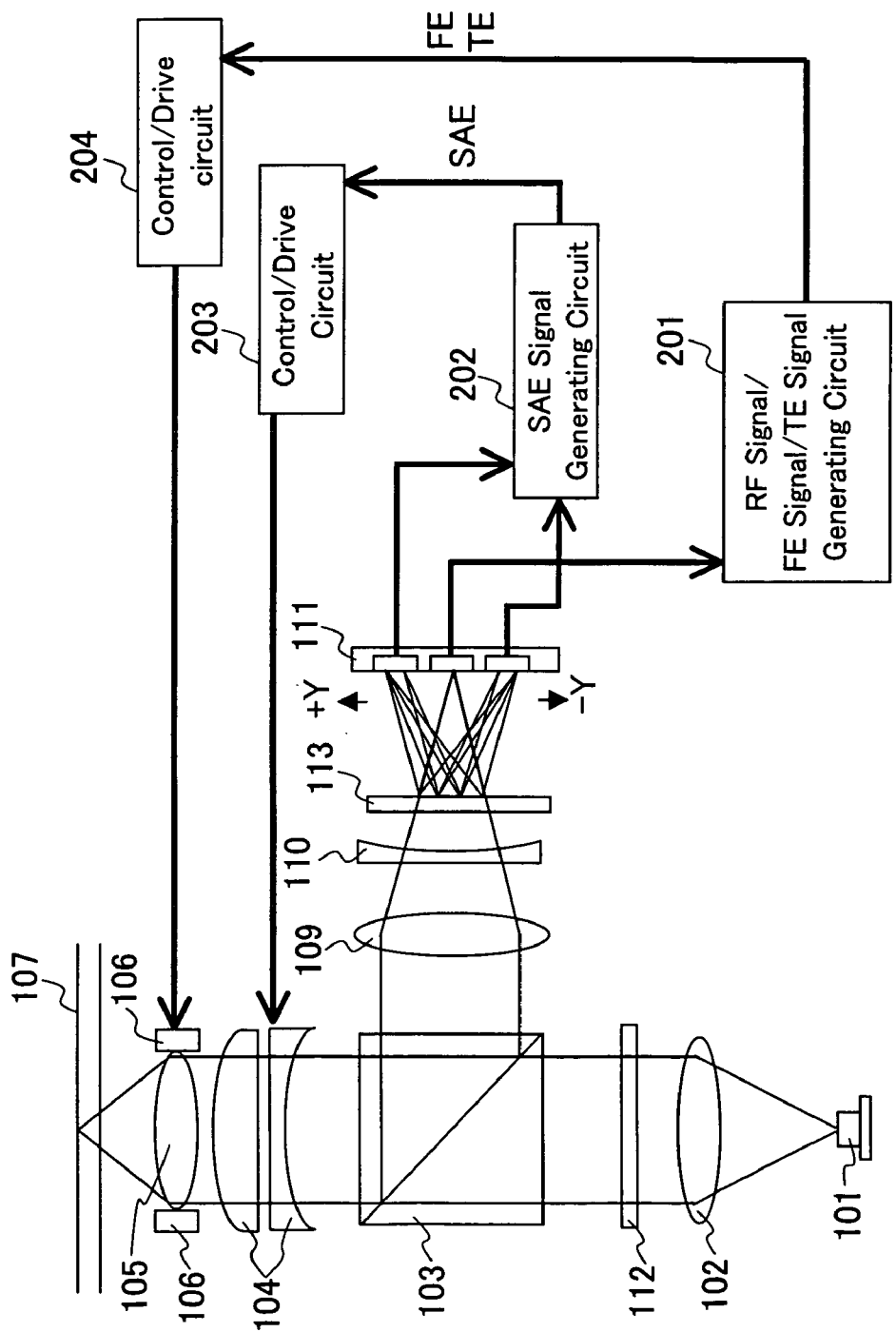
FIG. 10 is a view showing a configuration of another optical system and a circuit block diagram in the first embodiment.
Figure 11:
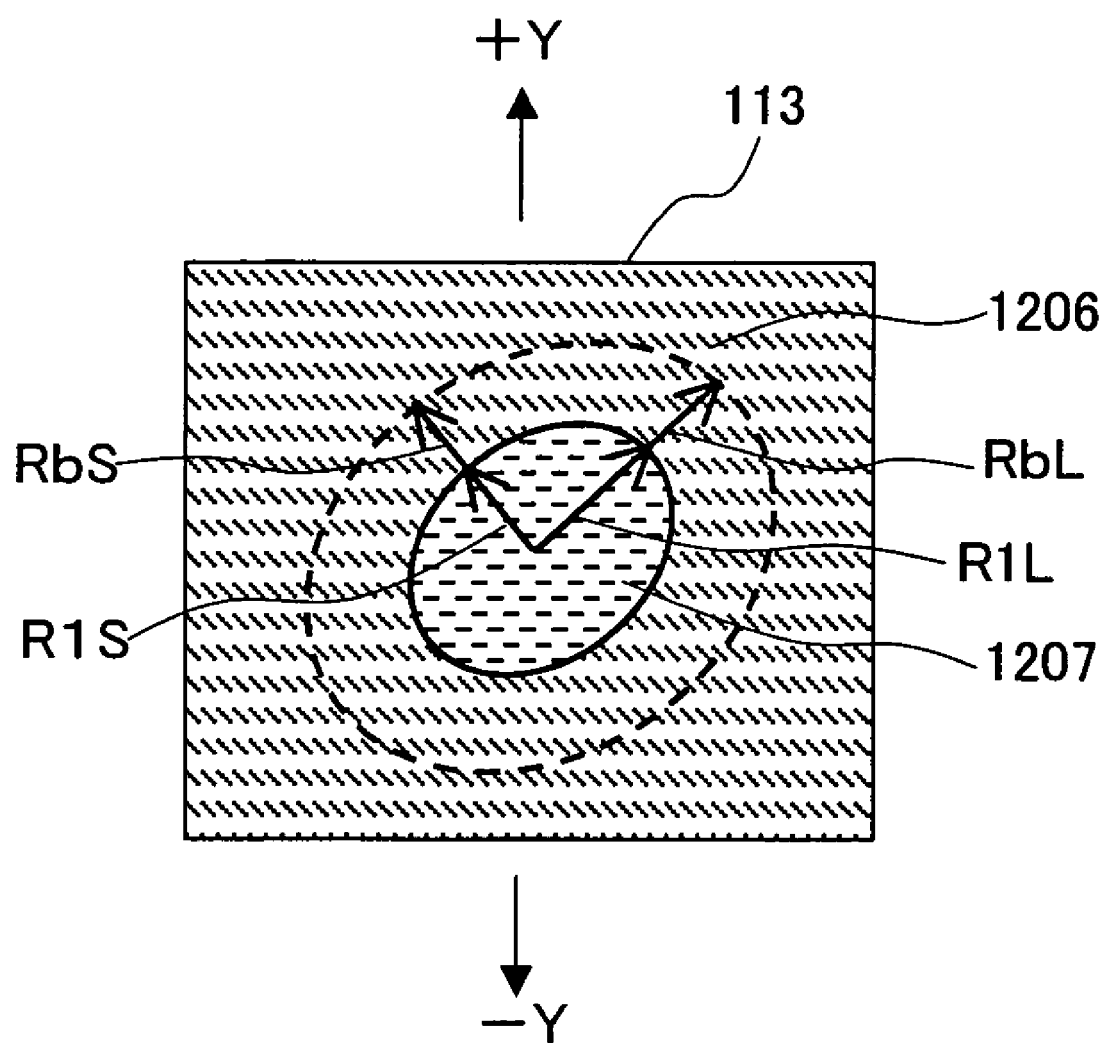
FIG. 11 is a front view showing a further hologram element 113 in the first embodiment.

Furthermore, the hologram element 108 is arranged in front of the detection lens 109. However, there is no limitation to this arrangement alone. The hologram element 108 may be disposed between the detection lens 109 and the cylindrical lens 110, or between the cylindrical lens 110 and the photodetector 111. FIG. 10 shows the configuration in which the hologram element 113 is disposed between the cylindrical lens 110 and the photodetector 111. The light beam is divided into an inner disklike region and the outer circumferential region by the hologram element 113. In this case, as shown in FIG. 11, a divisional shape of the hologram element 113 is preferably elliptical. This is because the light beam distorts in the elliptical shape due to the cylindrical lens 110. In accordance with the elliptical shape, also a dividing line for dividing the hologram element 113 into the outer circumferential region 1206 and the inner disklike region 1207 is made to be elliptical. When the radius of the major axis of the light beam on the hologram 113 is RbL, the radius of the minor axis thereof is RbS, the radius of the major axis of the dividing line is R1L, and the radius of the minor axis thereof is R1S, if the following relationships are satisfied, the detection sensibility becomes maximum and error in the spherical aberration detection does not occur even if defocus occurs:

$$R1L=0.75 \times RbL,$$

and $$R1S=0.75 \times RbS.$$

In this configuration, even if the focal distance f of the detection lens 109 is varied, the positional relationship between the spot for detecting spherical aberration and the detection region of the photodetector 111 is not displaced, and thus a spherical aberration signal can be obtained stably.

Figure 12:
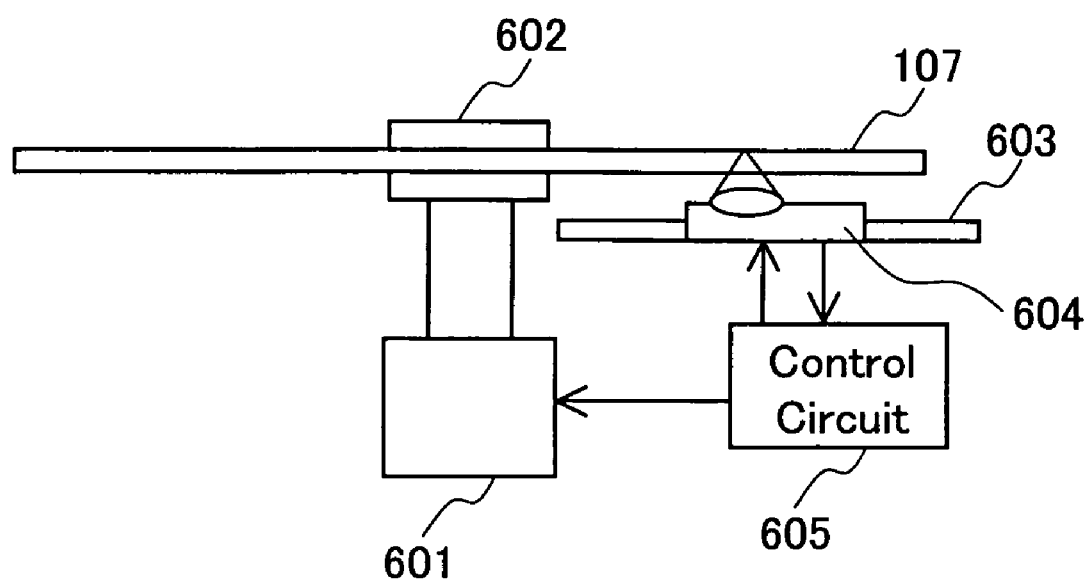
FIG. 12 is a view showing a configuration of an optical disk drive as an information recording and reproducing apparatus using an optical head apparatus 604 according to the first embodiment.

FIG. 12 is a schematic view showing a configuration of the optical disk drive as an optical information recording and reproducing apparatus. The optical disk 107 is rotated by a motor 601 as a movement means in a state in which it is fixed by a damper 602. The optical head apparatus 604 of this embodiment is moved in the radial direction of the disk by a traverse 603 as a movement means. The control circuit 605 sends signals indicating on/off for laser drive, focus control, and tracking control to the optical head apparatus 604 and receives a RF signal and reproduces information. Furthermore, the control circuit 605 sends control signals also to the motor 601 and the traverse 603 to control them. Thereby, it is possible to record and reproduce information with respect to an arbitray position of the optical disk 107 as an optical information storage medium.

Furthermore, in this embodiment, the spherical aberration is corrected by converting the wavefront by the combination of lenses, however, spherical aberration may be corrected by the use of, for example, liquid crystal. In this case, the spherical aberration on the light forwarding path can be corrected, but the spherical aberration on the light returning path may not be corrected. Even if the light free from the spherical aberration could be converged on the optical disk 107, the spherical aberration error signal cannot be zero. Also in this case, it is possible to find out the amount of spherical aberration corrected on the basis of the signal for driving, for example, liquid crystal. Control is carried out so that the signal obtained by multiplying the amount of corrected spherical aberration by the coefficient is subtracted from the spherical aberration error signal, and the resultant value becomes zero. Thus, the spot on the information layer of the optical disk 107 can be obtained without aberration.

In this embodiment, the differential push-pull method (DPP method) and the phase difference method are taken for the tracking control. The tracking control method may be a combination of usual push-pull method or 3-beam method. Furthermore, though an optical disk is employed as an information storage medium, the same effect can be obtained by using, for example, an optical card, etc.

(Second Embodiment)

Figure 13:
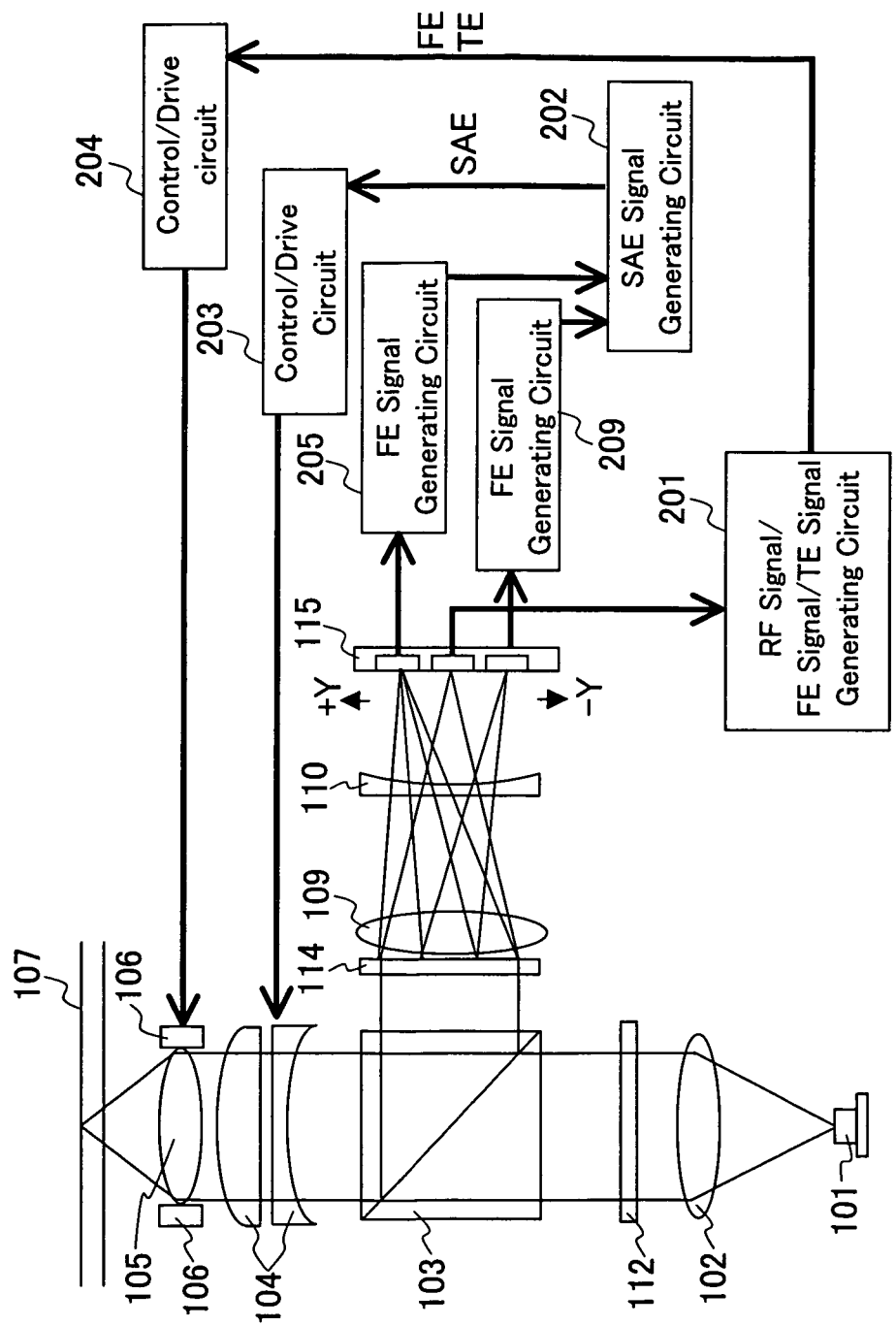
FIG. 13 is a view showing a configuration of an optical system and a circuit block diagram in an optical head apparatus according to a second embodiment according to the present invention.

In a second embodiment of the present invention, a case where the hologram element as a light dividing means for dividing light to detect spherical aberration is blazed will be mentioned. FIG. 13 shows a configuration of this optical system. This configuration is substantially the same as in the configuration of the first embodiment except that another hologram element 114 is used instead of the hologram element 108 and another photodetector 115 is used instead of the photodetector 111.

A signal output from the photodetector 115 is input to two FE signal generating circuits 205 and 209. A SAE signal generating circuit 202 receives signals output from the two FE signal generating circuits 205 and 209 and calculates the difference signal therebetween, and outputs the difference signal as a spherical aberration error signal (SAE signal).

Figure 14:
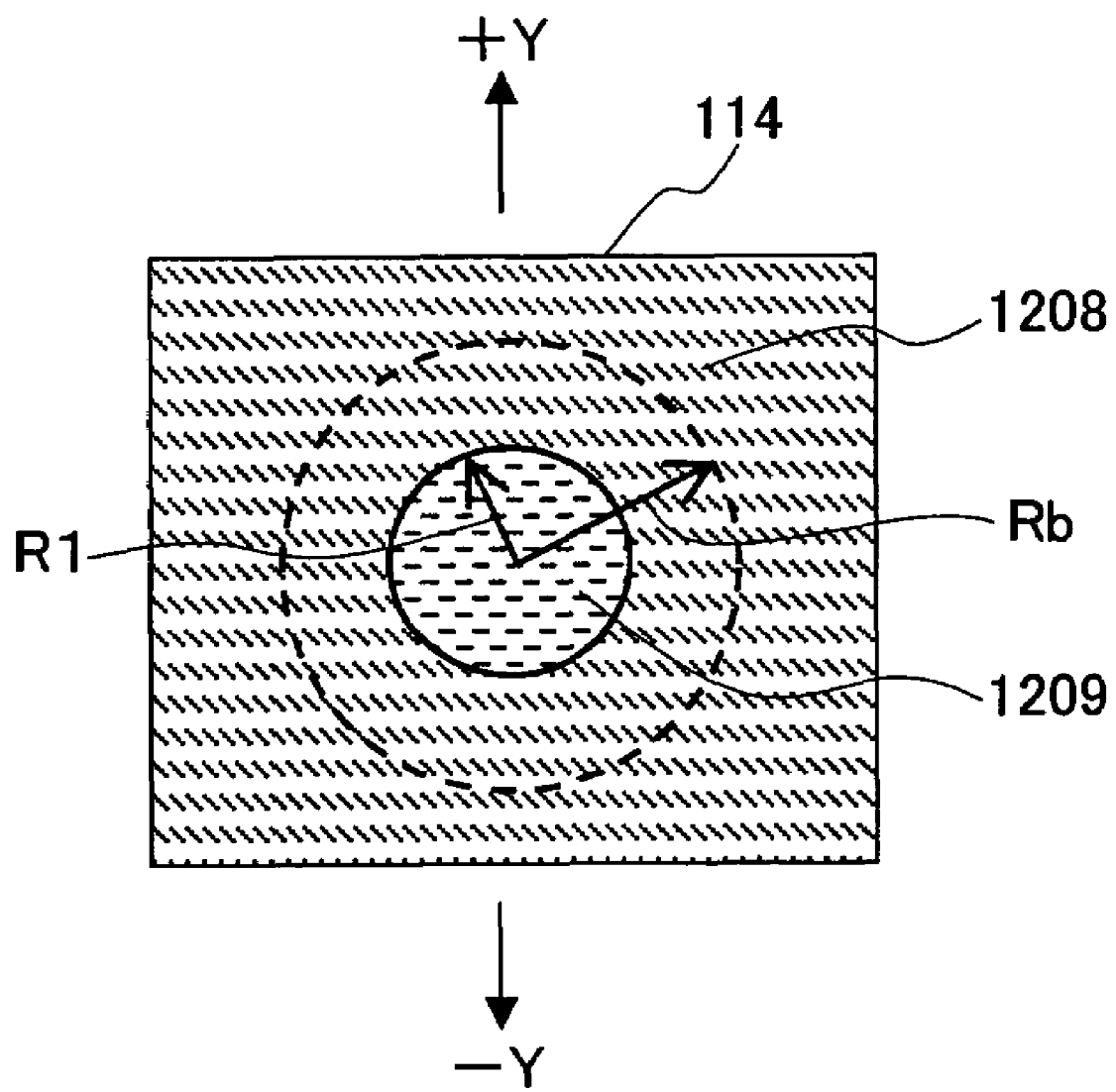
FIG. 14 is a front view showing a hologram element 114 in the second embodiment.

FIG. 14 is a front view showing a hologram element 114. In an outer region 1208 of a circle with a radius R1, a diffractive grating, which is blazed so that light is diffracted in the +Y direction in FIG. 14, is formed, while in an inner region 1209 of the circle with a radius R1, a diffractive grating, which is blazed so that light is diffracted in the -Y direction in FIG. 14, is formed. The projection of the beam reflected and diffracted by the optical disk 107 and passing through the objective lens 105 onto the hologram element 114 is a circle with a radius Rb (a circle shown by a broken line in the drawing). When R1/Rb is about 0.75, the detection sensitivity of the spherical aberration is maximized and error in the detection of the spherical aberration does not occur even if defocus occurs.

Figure 15:
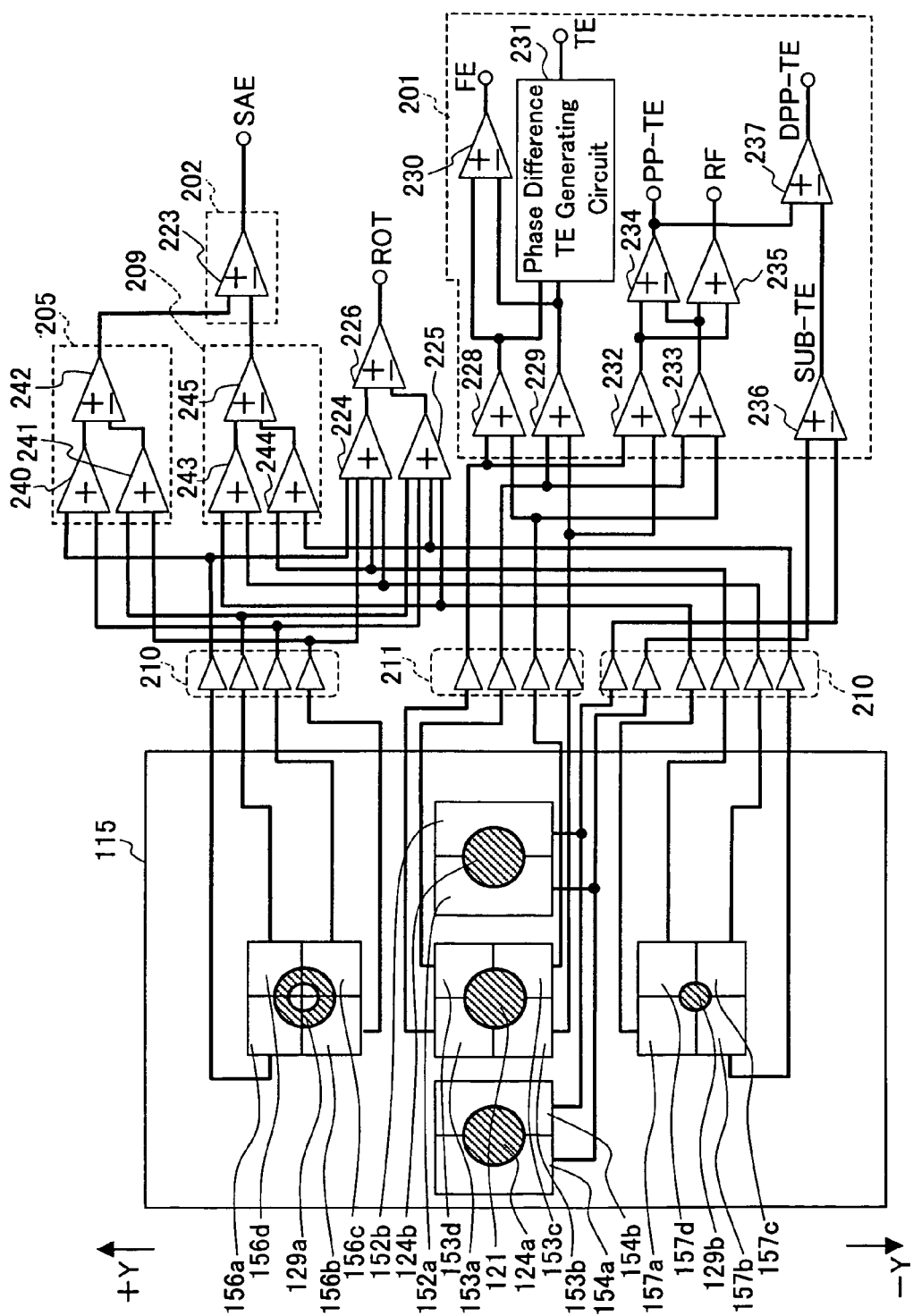
FIG. 15 is a view showing an arrangement of beams, a configuration of a photodetector 115, and a configuration of the peripheral circuit thereof in the second embodiment.

FIG. 15 is a view showing an arrangement of the detection regions in a photodetector 115 and a detail configuration of a FE signal generating circuit 205, etc. In FIG. 15, the photodetector 115 receives a light beam for detecting spherical aberration by two detection regions each divided into upper left, lower left, lower right and upper right detection regions. A beam 121 is the zero order light passing through the hologram element 114, a beam 129a is the +first order light diffracted by the region 1208 of the hologram element 114, and a beam 129b is the -first order light diffracted by the region 1209 of the hologram element 114. The detection regions 156a to 156d receive the beam 129a and output a current signal in accordance with the amount of the received light. A current-voltage conversion circuit 210 receives this current signal and outputs a voltage signal. On the other hand, the detection regions 157a to 157d receive the beam 129b and output a current signal in accordance with the amount of received light. The current-voltage conversion circuit 210 receives the current signal and outputs a voltage signal.

An adder 240 adds the output signals from the detection regions 156a and 156c, while the adder 241 adds the output signals from the detection regions 156b and 156d. A differential circuit 242 receives the output signal from the adder 240 and the output signal from the adder 241, and outputs the difference signal therebetween. This is a FE signal in the outer circumferential region. The adders 240 and 241 and the differential circuit 242 form a FE signal generating circuit 205.

Furthermore, an adder 243 adds the output signals from the detection regions 157a and 157c, while the adder 244 adds the output signals from the detection regions 157b and 157d. A differential circuit 245 receives the output signal from the adder 243 and the output signal from the adder 244, and outputs the difference signal therebetween. This is a FE signal in the inner disklike region. The adders 243 and 244 and the differential circuit 245 form another FE signal generating circuit 209. A differential circuit 223 receives the output signal from the differential circuit 242 and the output signal from the differential circuit 245 and outputs the difference signal therebetween. This is a spherical aberration error signal (SAE signal). The differential circuit 223 forms a SAE signal generating circuit 202.

The adder 224 adds the output signals from the detection regions 156a and 156b and the detection regions 157c and 157d. The adder 225 adds the output signals from the detection regions 156c and 156d and the detection regions 157a and 157b. The differential circuit 226 receives the output signal from the adder 224 and the output signal from the adder 225, and outputs the difference signal therebetween. This is a rotation error signal (ROT signal) representing rotation displacement between the beam 129a and detection regions 156a to 156d and the rotation displacement between the beam 129b and detection region 157a to 157d. The ROT signal is used to adjust an angle in the rotational direction between the hologram element 114 for generating the spherical aberration beam and the photodetector 115, when the head is adjusted.

In this embodiment, with spherical aberration, a beam 129b of the light in the inner disklike region and beam 129a of light in the outer circumferential region are distorted in the direction that is different by 90 degrees. This distortion is caused by astigmatic aberration given by the cylindrical lens 110. The principle that the direction in which the beam is distorted differs depending upon the location relationship of the photodetector and the converging point is utilized also as a focus error detection of the astigmatic aberration method. Based on the principle and the arrangement of beams, with respect to the detection regions 156 and 157, a spherical aberration error signal can be obtained by adding signals from the detection regions located diagonally and taking the difference signal therebetween. By controlling the spherical aberration correcting means 104 on the basis of the spherical aberration error signal, the spherical aberration of the spot can be kept small. Thus, it is possible to record and reproduce information stably and also the error rate can be reduced.

Furthermore, according to the configuration of this embodiment, it is possible to reduce and simplify the range of the detection regions of the photodetector, thus miniaturizing an optical head apparatus.

Furthermore, when information is recorded or reproduced with respect to, for example, a two-layered disk, the influence of light reflected by the information layer other than the intended layer can be reduced.

In this embodiment, when the output signal from the differential circuit 242 and the output signal from the differential circuit 245 are subtracted by the differential circuit 223, subtraction is carried out directly. However, any one of the output signals may be adjusted so that the amplification is balanced by a variable gain amplifier. In this case, since it is possible to adjust the balance of the spherical aberration error signal, the spherical aberration correction control can work stably.

Furthermore, in this embodiment, after FE signals are generated in the inner disklike region and in the outer circumferential region, separately, the SAE signal was determined by subtraction. However, a sum signal SAE 1 is obtained by adding a sum signal (156a+156c) of the output signals from the diagonal positions of the detection region 156 and a sum signal (157b+157d) of the output signals from the opposite diagonal positions of the detection region 157, while a sum signal SAE 2 is obtained by adding a sum signal (157a+157c) of the output signals from the diagonal positions of the detection region 157 and a sum signal (156b+156d) of the output signals from the opposite diagonal position of the detection region 156, and then based on the difference between SAE1 and SAE2 is taken, and the spherical aberration error signal SAE may be calculated. According to this configuration, a circuit can be simplified.

Also in this embodiment, as in the first embodiment, the spot of the sub-beam by the DPP method and the spot for SAE are arranged in the direction substantially perpendicular to zero order light of the main beam, thus making it possible to reduce the interference with each other.

(Third Embodiment)

Figure 16:
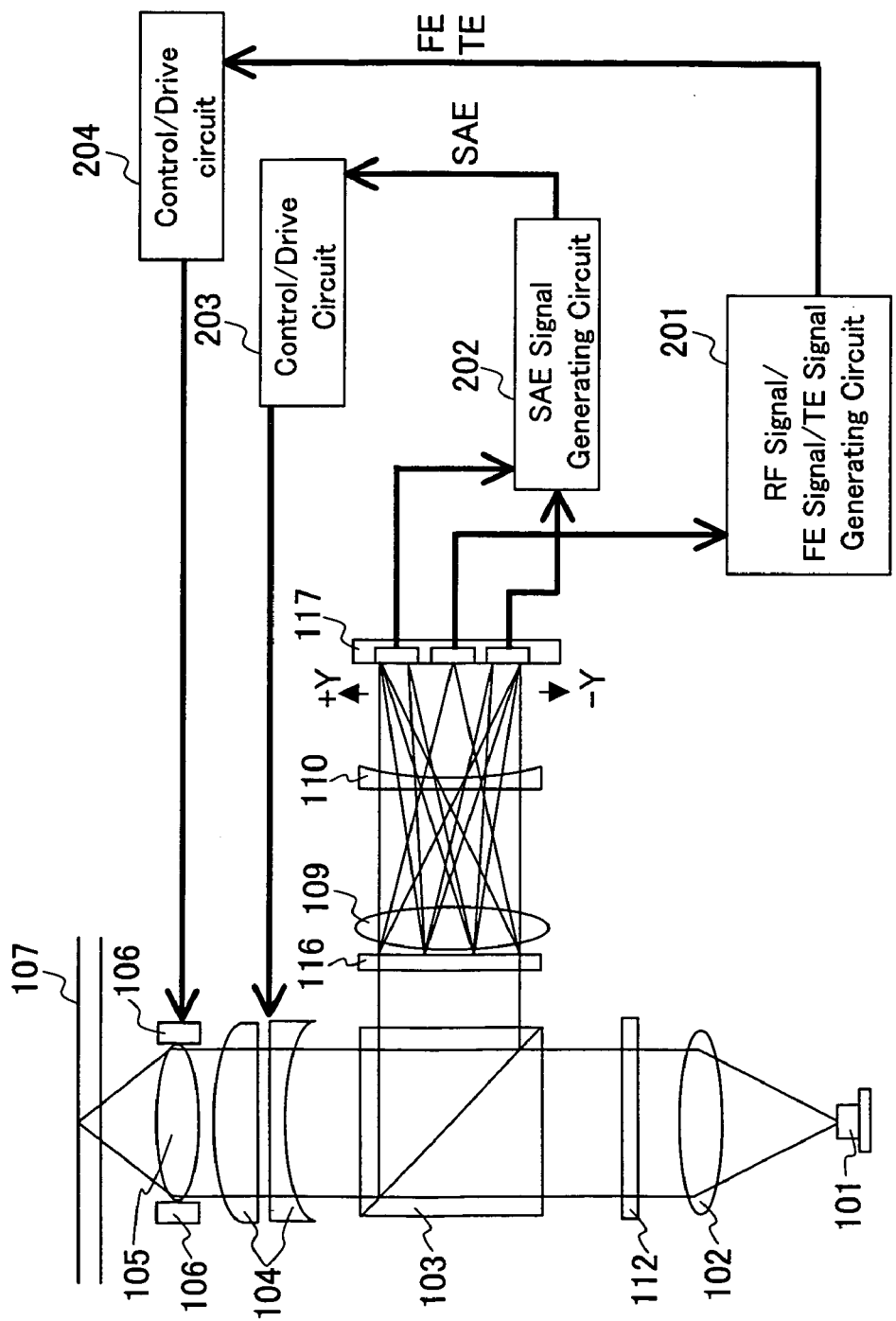
FIG. 16 is a view showing a configuration of an optical system and a circuit block diagram in an optical head apparatus according to a third embodiment of the present invention.

Next, as a third embodiment, the configuration in which light in an inner disklike region and light in an outer circumferential region are diffracted in the oblique direction is explained. FIG. 16 shows a configuration of this optical system. This configuration is substantially the same as the first embodiment except that another hologram element 116 is used instead of the hologram element 108 and another photodetector 117 is used instead of the photodetector 111.

Figure 17:
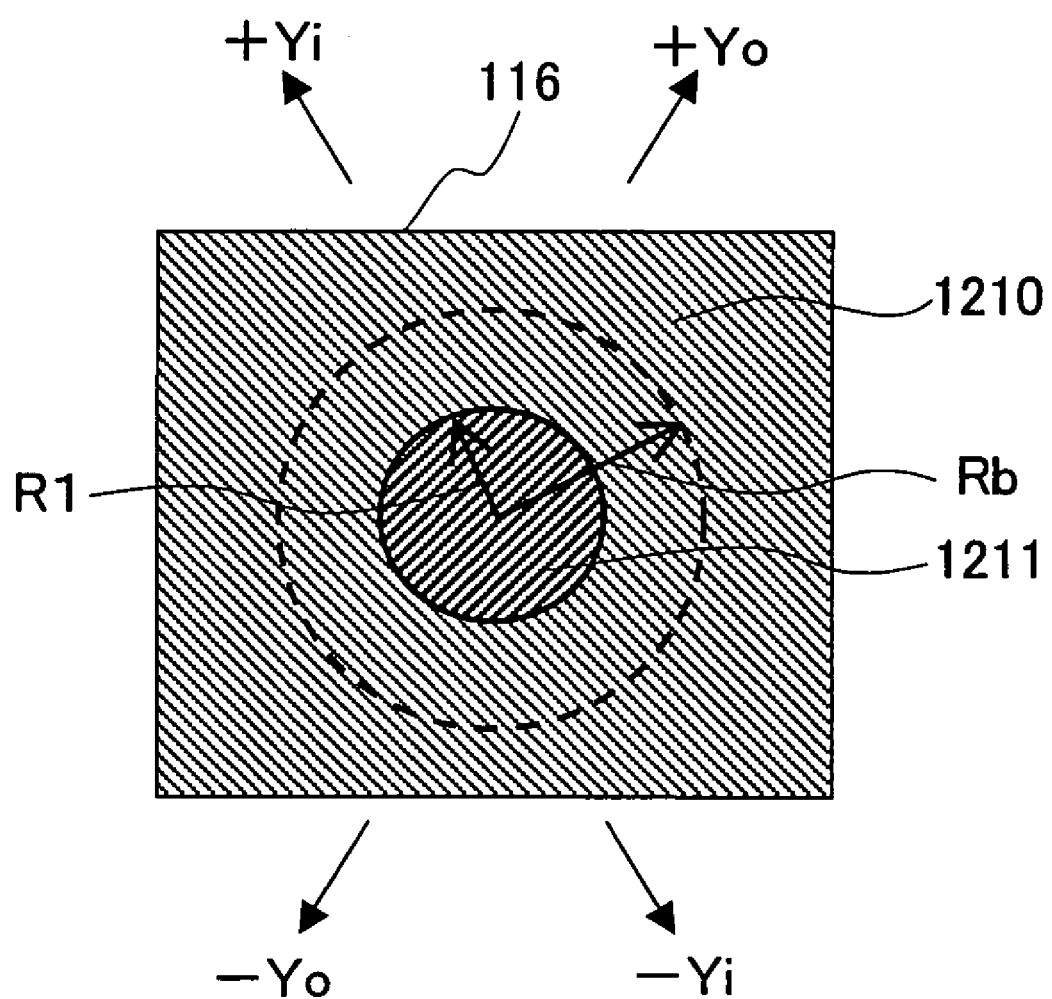
FIG. 17 is a front view showing a hologram element 116 in the third embodiment.

FIG. 17 is a front view showing a hologram element 116. Light entering the outer region 1210 of the circle with a radius R1 is diffracted in the +Yo and −Yo directions. On the other hand, light entering the inner region 1211 of the circle with a radius R1 is diffracted in the +Yi and −Yi directions. A projection of the beam reflected and diffracted by the optical disk 107 and passing through the objective lens 105 is a circle with radius Rb (a circle shown by broken line in the drawing). When R1/Rb is about 0.75, the detection sensitivity of the spherical aberration is maximized and the spherical aberration error does not occur even if defocus occurs.

Figure 18:
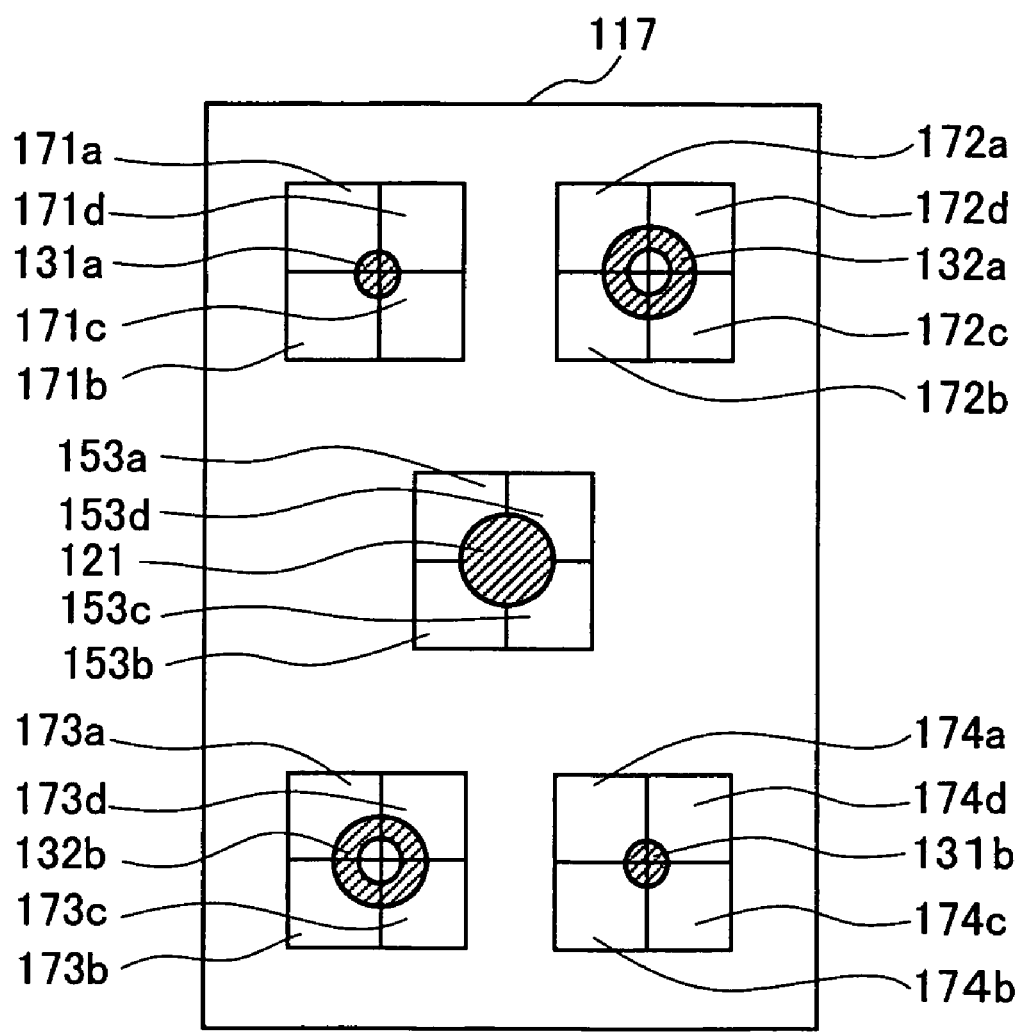
FIG. 18 is a view showing an arrangement of beams, a configuration of a photodetector 117, and a configuration of the peripheral circuit thereof in the third embodiment.

FIG. 18 shows an arrangement of the detection regions of the photodetector in a case where the hologram element 116 is used. Herein, the detection regions for the sub-beams for DPP are omitted. In FIG. 18, a beam 121 of the zero order light that was not diffracted by the hologram element 116 is received by the central detection regions 153a to 153d. Signals obtained from the beam are treated as in the first embodiment with reference to FIG. 3. Among the beam diffracted by the outer region 1210 of the hologram element 116, a beam 132a is a beam diffracted in the +Yo direction and a beam 132b is a beam diffracted in the −Yo direction. These beams 132a and 132b are received by the detection regions 172a to 172d and 173a to 173d, respectively. Herein, a difference signal between the signal obtained by adding signals in accordance with the light received by the four detection regions 172a, 172c, 173a and 173c and the signal obtained by adding the signals in accordance with the light received by the other four detection regions 172b, 172d, 173b and 173d is represented by SAEo.

On the other hand, among the beams diffracted by the inner region 1211 of the hologram element 116, a beam 131a is a beam diffracted in the +Yi direction and a beam 131b is a beam diffracted in the −Yi direction. These beams 131a and 131b are received by the detection regions 171a to 171d and 174a to 174d, respectively. Herein, a difference signal between the signal obtained by adding the signals in accordance with the light received by the four detection regions 171a, 171c, 174a and 174c and the signal obtained by adding the signals in accordance with the light received by the other four detection regions 171b, 171d, 174b and 174d is represented by SAEi.

As a result, the spherical aberration error signal SAE is obtained by the subtraction between the SAEo and the SAEi.

In this configuration, since the cross sectional shape of the hologram element 116 may be symmetric, as compared with the blazed hologram element 114 in the second embodiment, it is advantageous in that the hologram element can easily be produced.

Furthermore, since the diffraction angle of the inner region 1211 of the hologram element is substantially equal to that of outer region 1210 thereof, the pitch of the hologram elements is substantially constant. Thus, the hologram element can be produced easily.

(Fourth Embodiment)

In a fourth embodiment of the present invention, a method including dividing reflected light from an optical disk as an information storage medium into two beams, i.e., an inner disklike beam and an outer circumferential beam; and obtaining a spherical aberration error signal from the diffracted light and obtaining an information reproducing signal from the zero order light will be mentioned. In this embodiment, the above-mentioned method is combined with the spot size method.

Figure 19:
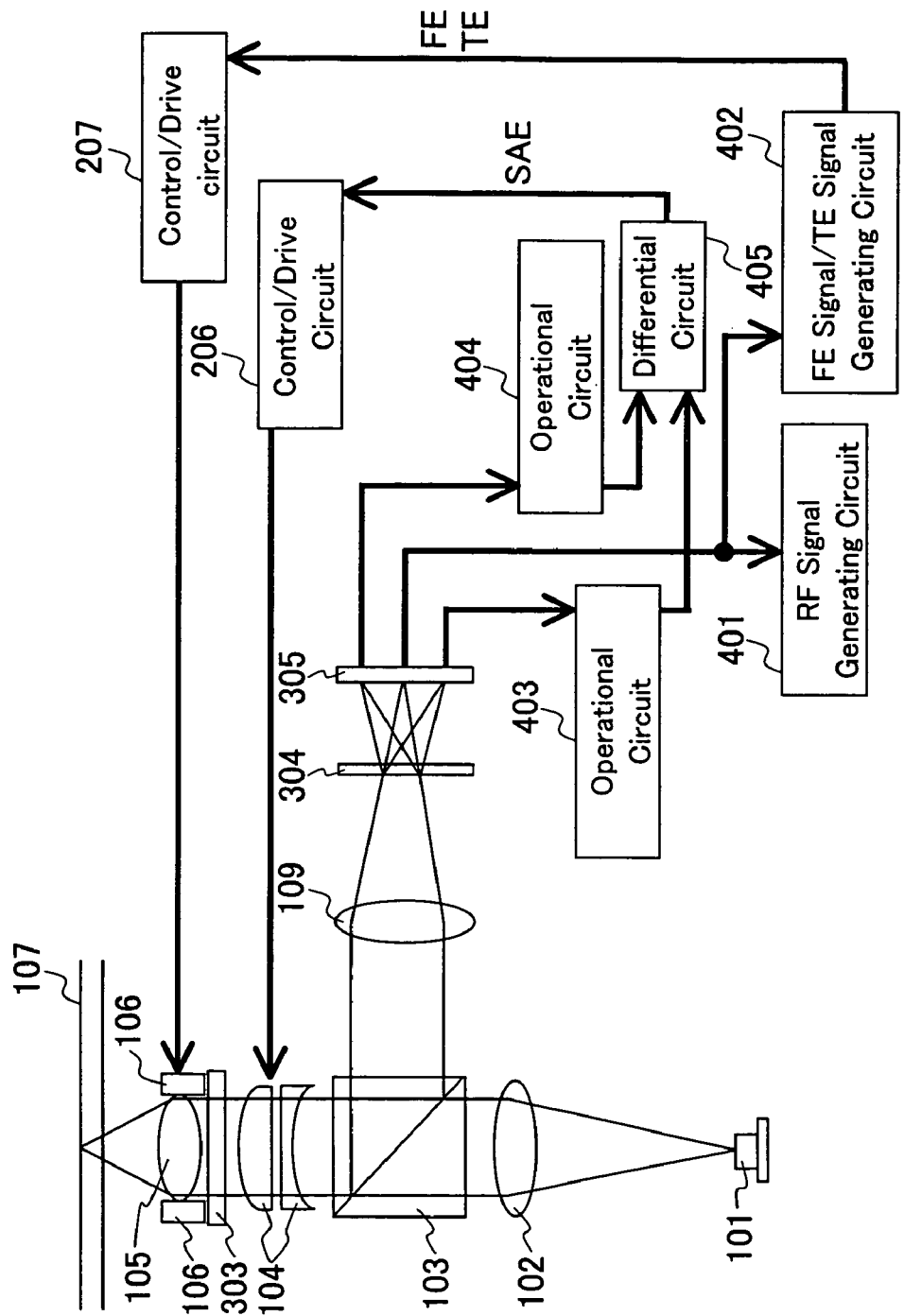
FIG. 19 is a view showing a configuration of an optical system and a circuit block diagram in an optical head apparatus according to a fourth embodiment of the present invention.

FIG. 19 shows a configuration of an optical head apparatus according to the fourth embodiment of the present invention. The explanation of the similar portions to the first embodiment is omitted herein. The configuration of this embodiment includes a hologram element 303 that is moved together with an objective lens 105 by an actuator 106. The hologram element 303 includes a quarter wavelength plate and a polarization hologram. Light traveling toward the optical disk 107 is not diffracted by the hologram element 303, however, a part of the light returning from the optical disk 107 is diffracted.

Furthermore, a part of the beam converged by the detection lens 109 is diffracted by the hologram element 304 and enters the photodetector 305. After receiving the light, a signal is output from the photodetector 305 and input to a RF signal generating circuit 401 and a FE signal/TE signal generating circuit 402. A signal output from the RF signal generating circuit 401 is used to reproduce information recorded on the optical disk 107. In the FE signal/TE signal generating circuit 402, a focus error (FE) signal and tracking error (TE) signal are generated and input into a control/drive circuit 207. The control/drive circuit 207 receives the FE signal and TE signal and drives the actuator 106 of the objective lens 105.

On the other hand, the +first order light and the −first order light diffracted by the hologram element 304 enter the photodetector 305 and is converted to electric signals, which respectively are input into the operational circuit 403 and 404. Signals output from the operational circuits 403 and 404 are input to a differential circuit 405 and the difference signal therebetween is generated. This is a spherical aberration error (SAE) signal. The SAE signal is input to the control/drive circuit 206, thereby changing the interval between a concave lens and a convex lens of the lens combination 104 and controlling these so that the spherical aberration of the beam on the optical disk 107 is minimized.

Figure 20:
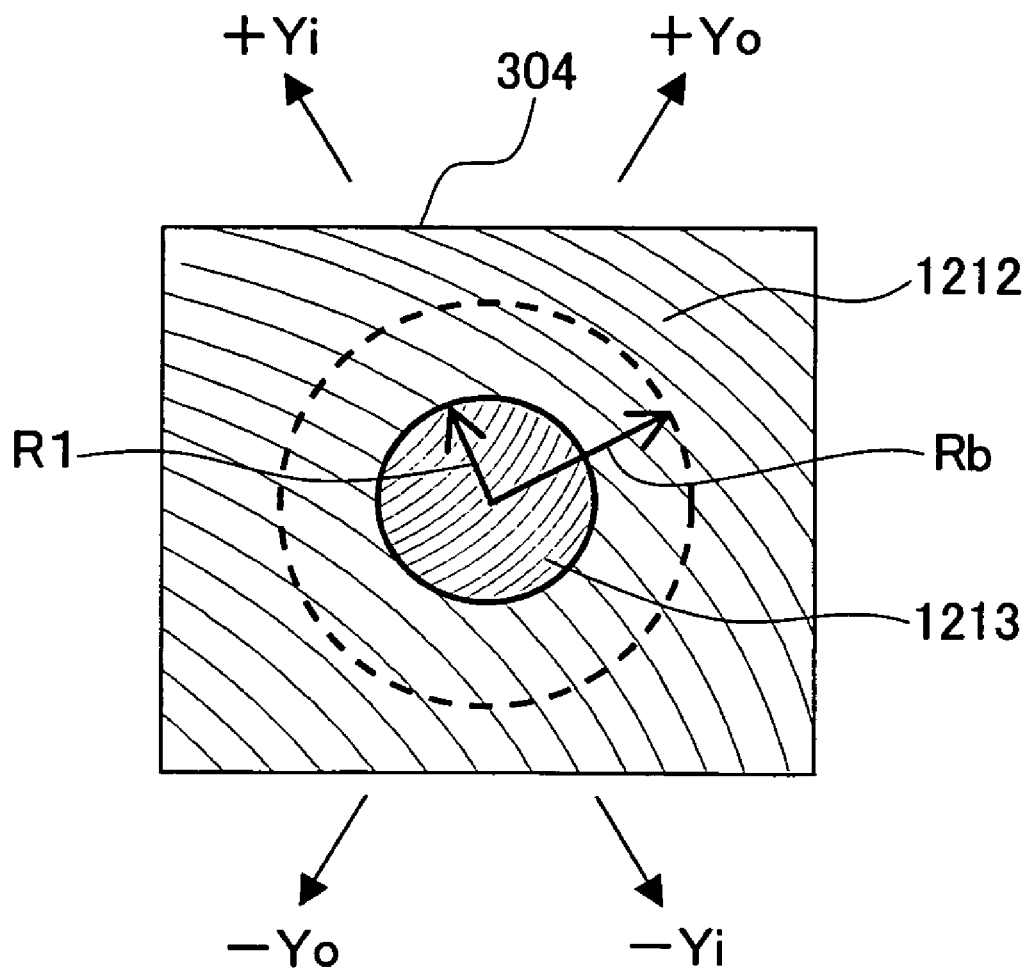
FIG. 20 is a front view showing a hologram element 304 in a fourth embodiment.

FIG. 20 is a front view showing a hologram element 304. Light entering the outer region 1212 of a circle with radius R1 is diffracted in the +Yo direction and in the −Yo direction. On the other hand, light entering the inner region 1213 of the circle with radius R1 is diffracted in the +Yi direction and in the −Yi direction. The projection of the beam reflected and diffracted by the optical disk 107 and passing through the objective lens 105 onto the hologram element 304 is a circle with a radius of Rb (a circle shown by a broken line in the drawing). When R1/Rb is set to be about 0.75, the detection sensitivity of the spherical aberration is maximized and error in detecting spherical aberration does not occur even if defocus occurs.

Figure 21:
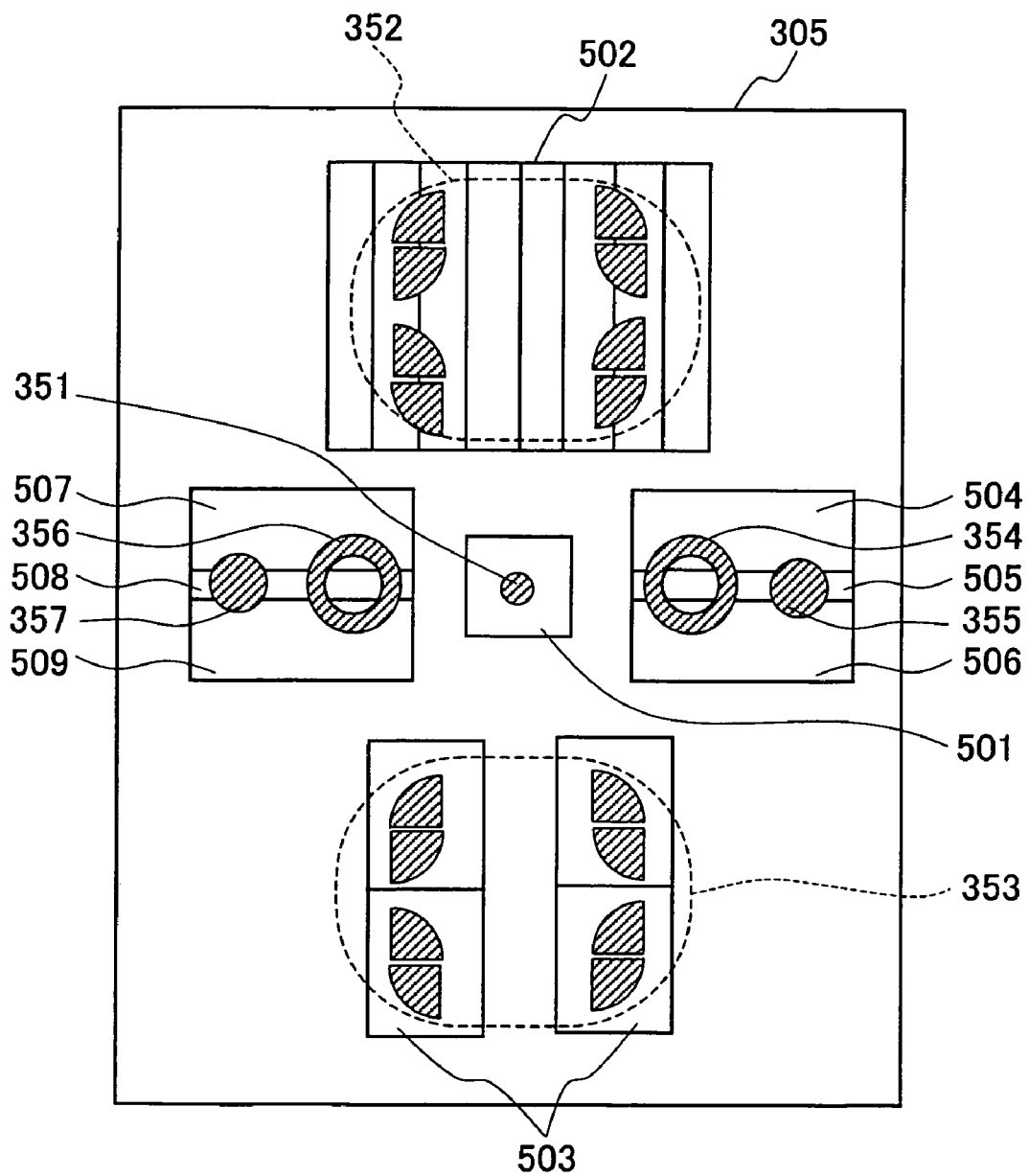
FIG. 21 is a view showing an arrangement of beams and a configuration of a photodetector 305 in the fourth embodiment.

FIG. 21 is a front view showing a photodetector 305 and the arrangement of beams. The beam is divided into four sections by the hologram element 303. From the respective regions, a beam that comes into focus in front of the detection surface of the photodetector 305 and a beam that comes into focus behind the detection surface thereof are generated. A beam 351 is the zero order light beam passing through both the hologram elements 303 and 304. This beam 351 is detected by the detection region 501 and the signal output therefrom is input into the RF signal generating circuit 401.

The +first order light diffracted by the hologram element 303 becomes eight beams 352. These beams 352 are detected by the detection regions 502 composed of eight strip portions. Signals output from these detection regions are input to the FE signal/TE signal generating circuit 402 so as to generate a focus error (FE) signal. The focus error signal can be obtained by the spot size method.

On the other hand, the −first order light diffracted by the hologram element 303 becomes eight beams 353. These beams 353 are detected by the detection regions 503 composed of four portions. Signals output from these detection regions are input to the FE signal/TE signal generating circuit 405 to generate a tracking error (TE) signal. The tracking error signal can be obtained by the push-pull method and the phase difference method.

Furthermore, a part of the zero order light passing through the hologram element 303 is diffracted by the hologram element 304 and becomes beams 354, 355, 356 and 357. The beam 354 is a beam diffracted by the outer region 1212 of the hologram element 304 and comes into focus in front of the detection surface of the photodetector 305. A beam 355 is a beam diffracted by the inner region 1213 of the hologram element 304 and comes into focus behind the detection surface of the photodetector 305. A beam 356 is a beam diffracted by the outer region 1212 of the hologram element 304 and comes into focus behind the detection surface of the photodetector 305. The beam 357 is a beam diffracted by the inner region 1213 of the hologram element 304 and comes to focus in front of the detection surface of the photodetector 305.

The beams 354 and 355 are received by the detection regions 504, 505 and 506, and the beams 356 and 357 are received by the detection regions 507, 508 and 509. The output signals from the detection regions 504 to 506 are input to an operational circuit 403 where the operation: (signal from the region 504)+(signal from the region 506) −(signal from the region 505) is carried out and the result is output. The output signals from the detection regions 507 to 509 are input to an operational circuit 404 where the operation: (signal from the region 507)+(signal from the region 509)−(signal from the region 508) is carried out and output. The differential circuit 405 receives the output signals from operational circuits 403 and 404 and outputs the difference signal therebetween. This difference signal becomes a spherical aberration error signal (SAE signal).

In this embodiment, by the hologram element 303 driven together with the objective lens 105, beams for the focus error signal and for the tracking error signal are separated from the beam for a RF signal. Furthermore, by the hologram element 304 disposed between the detection lens 109 and photo detector 305, a beam for detecting spherical aberration is generated from the beam for a RF signal. In this case, since the RF signal can be detected by one detection region and one amplifier, it is possible to detect the spherical aberration in the other detection region with the RF signal maintained at a high SN ratio.

Furthermore, in the case of combination with the spot size method, if the dividing direction of the detection regions of the photodetector 305 is the same as the track direction of the optical disk 107, when the spot on the optical disk 107 crosses over a track, an error occurs in the SAE signal. Therefore, it is preferable as the arrangement that the direction of the dividing line of the detection regions is perpendicular to the track direction. On the other hand, if the wavelength of the light source is changed or the distance between the hologram element and the photodetector is changed, each beam moves in the radial direction around the beam 351, which is zero order light, as a center. Therefore, the dividing direction of the detection regions is preferably the substantially radial direction around the beam 351 as a center.

In FIG. 21, in order to solve the above-mentioned two problems, the dividing direction of the detection regions is maintained in substantially the radial direction around the beam 351 as a center; beams 354 to 357 for detecting a spherical aberration are provided with astigmatic aberration in the 45 degree direction with respect to the track; and the projection direction of the track on the optical disk and the dividing direction of the detection regions are perpendicular to each other. The astigmatic aberration in the 45-degree direction is given by the hologram element 304. Thereby, even if the spot size method is used, even under the wavelength fluctuation or even in crossing over a track, the spherical aberration error signal can be obtained stably.

According to this embodiment, since a SSD (Spot Size Detection) method is used for detection of spherical aberration, it is possible to reduce the disturbance at the time of track traverse, thus recording and reproducing information stably.

(Fifth Embodiment)

In a fifth embodiment of the present invention, a method of dividing a reflected light from the optical disk as an information storage medium into two beams, i.e. an inner disklike beam and an outer circumferential beam by the hologram element; obtaining a spherical aberration error signal together with a tracking error signal and a focus error signal from the diffracted light; and obtaining an information reproducing signal from the zero order light will be mentioned.

Figure 22:
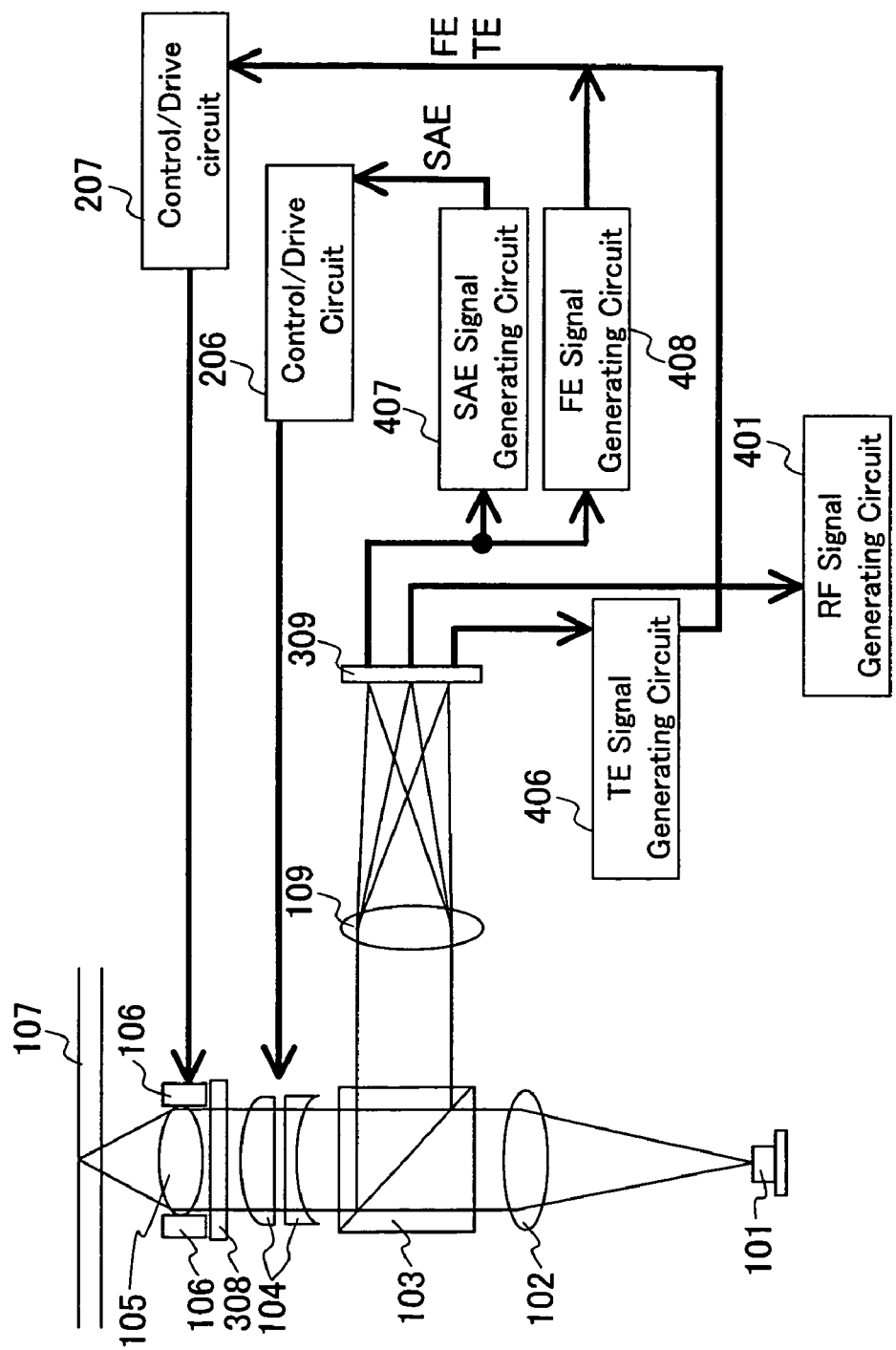
FIG. 22 is a view showing a configuration of an optical system and a circuit block diagram in an optical head apparatus according to a fifth embodiment of the present invention.

FIG. 22 is a view showing a configuration of an optical head apparatus according to the fifth embodiment of the present invention. The explanation of the similar portions to the first and second embodiment is omitted herein. The configuration of this embodiment includes a hologram element 308 that is moved together with an objective lens 105 by an actuator 106. The hologram element 308 includes a quarter wavelength plate and a polarization hologram. Light traveling toward the optical disk 107 is not diffracted, however, a part of the light returning from the optical disk 107 is diffracted. After receiving the light, a signal is output from the photodetector 309 and the output signal is input to a RF signal generating circuit 401, a TE signal generating circuit 406, a SAE signal generating circuit 407 and a FE signal generating circuit 408.

An output signal from the RF signal generation circuit 401 is used to reproduce information recorded on the optical disk 107. In the TE signal generating circuit 406, a tracking error (TE) signal is generated; in the FE signal generating circuit 408, a focus error (FE) signal is generated; and the TE signal and FE signal are input to a control/drive circuit 207. After receiving the FE signal and TE signal, the control/drive circuit 207 drives the actuator 106 of the objective lens 105.

Furthermore, the signal output from the photodetector 309 is input to the SAE signal generating circuit 407 as well and a spherical aberration error (SAE) signal is output therefrom. The SAE signal is input to the control/drive circuit 206, thereby changing the interval between a concave lens and a convex lens of the lens combination 104 and controlling it so that spherical aberration of the beam on the optical disk 107 is minimized.

Figure 23:
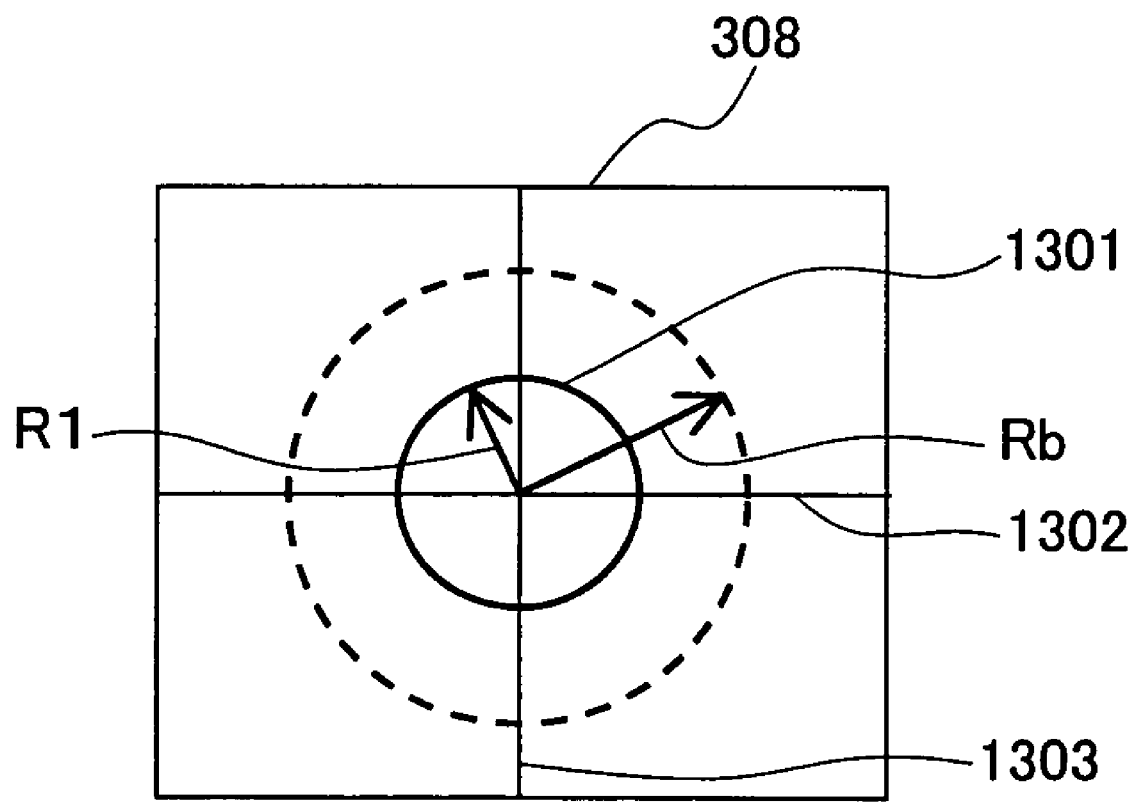
FIG. 23 is a front view showing a hologram element 308 in the fifth embodiment.

FIG. 23 is a front view showing a hologram element 308. Light beam is divided into eight regions by a circular dividing line 1301 with a radius R1 and two dividing lines 1302 and 1303 crossing with each other in the hologram element 308. Each region is further divided into two regions (not shown in the drawing), from each of which a front side focus beam and a rear side focus beam are generated. A projection of the beam reflected and diffracted by the optical disk 107 and passing through the objective lens 105 onto the hologram element 308 is a circle with a radius of Rb (a circle shown by a broken line in the drawing). When R1/Rb is set to be about 0.75, the detection sensitivity of the spherical aberration is maximized and the error in the detection of spherical aberration does not occur even if defocus occurs.

Figure 24:
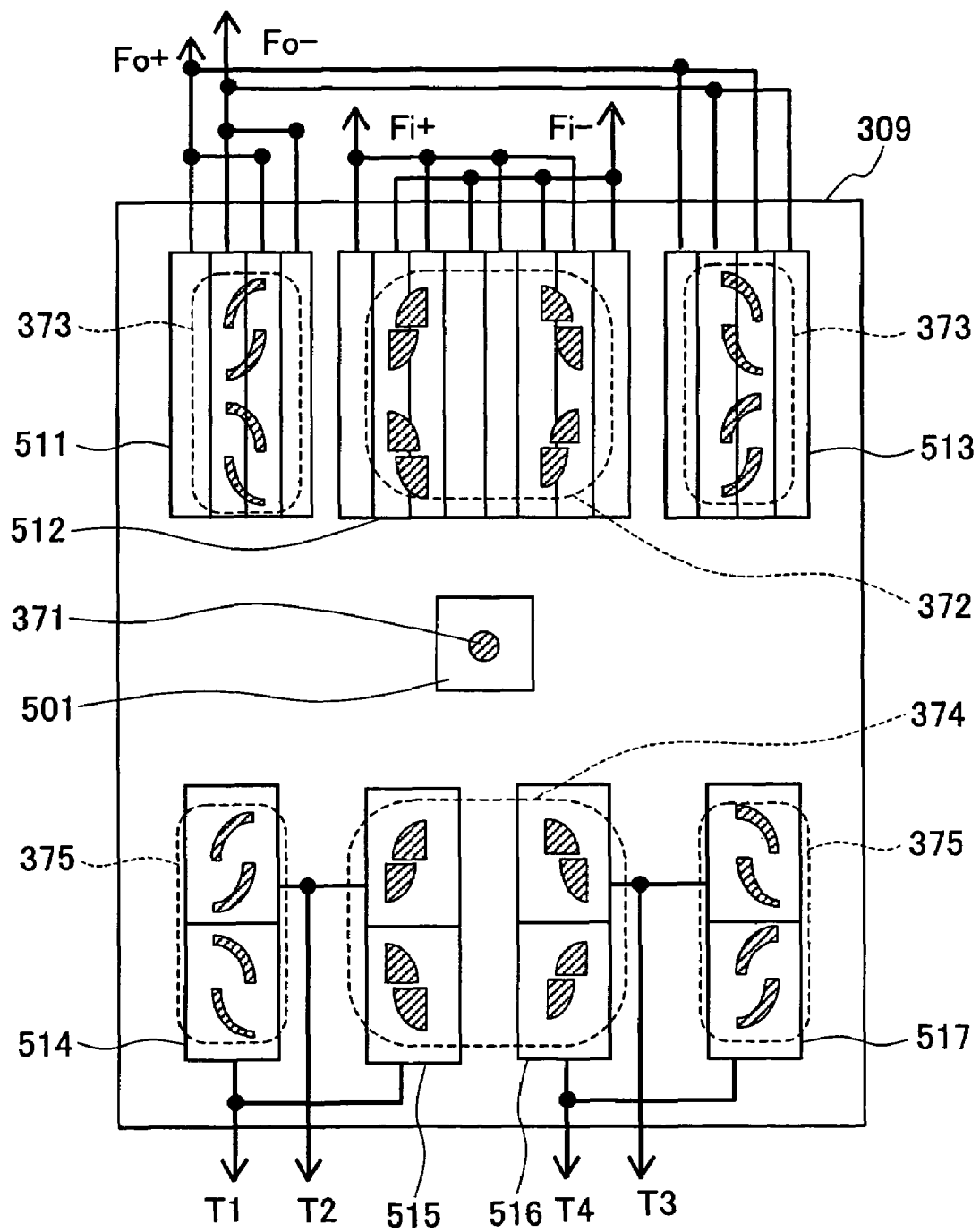
FIG. 24 is a view showing an arrangement of beams and a configuration of a photodetector 309 in the fifth embodiment.

FIG. 24 is a front view showing a photodetector 309 and the arrangement of beams. The beam is divided into eight portions by the hologram element 308. From each of the regions, a beam that comes into focus in front of the detection surface of the photodetector 309 and a beam that comes into focus behind the detection surface thereof are generated. A beam 371 is the zero order light passing through the hologram element 308. This beam 371 is detected by the detection region 501 and an output signal therefrom is input to the RF signal generating circuit 401.

Beams 372 and beams 373 (total number of beams is 16) are the +first order light diffracted by the hologram element 308. A beam 372 is the +first order diffracted light generated in an inner region of a circular dividing line 1301 of the hologram element 308. Beams 373 are the +first order diffracted light generated in the outer region thereof. The beams 372 are received by the detection region 512, and from the regions alternately arranged, Fi+ signal and Fi−signal are generated. The beams 373 are received by the detection regions 511 and 513, and from the regions alternately arranged, Fo+ signal and Fo−signal are generated.

Beams 374 and beams 375 (total number of beams is 16) are the −first order light diffracted by the hologram element 308. Beams 374 are the −first order diffracted light generated in an inner region of a circular dividing line 1301 of the hologram element 308 and beams 375 are the −first order diffracted light generated in the outer region thereof. The beams 374 are received by the detection regions 515 and 516, and the beams 375 are received by the detection regions 514 and 517. Signals output from the corresponding detection regions of the detection regions 514 to 517 are added and T1, T2, T3 and T4 signals are generated.

Figure 25:
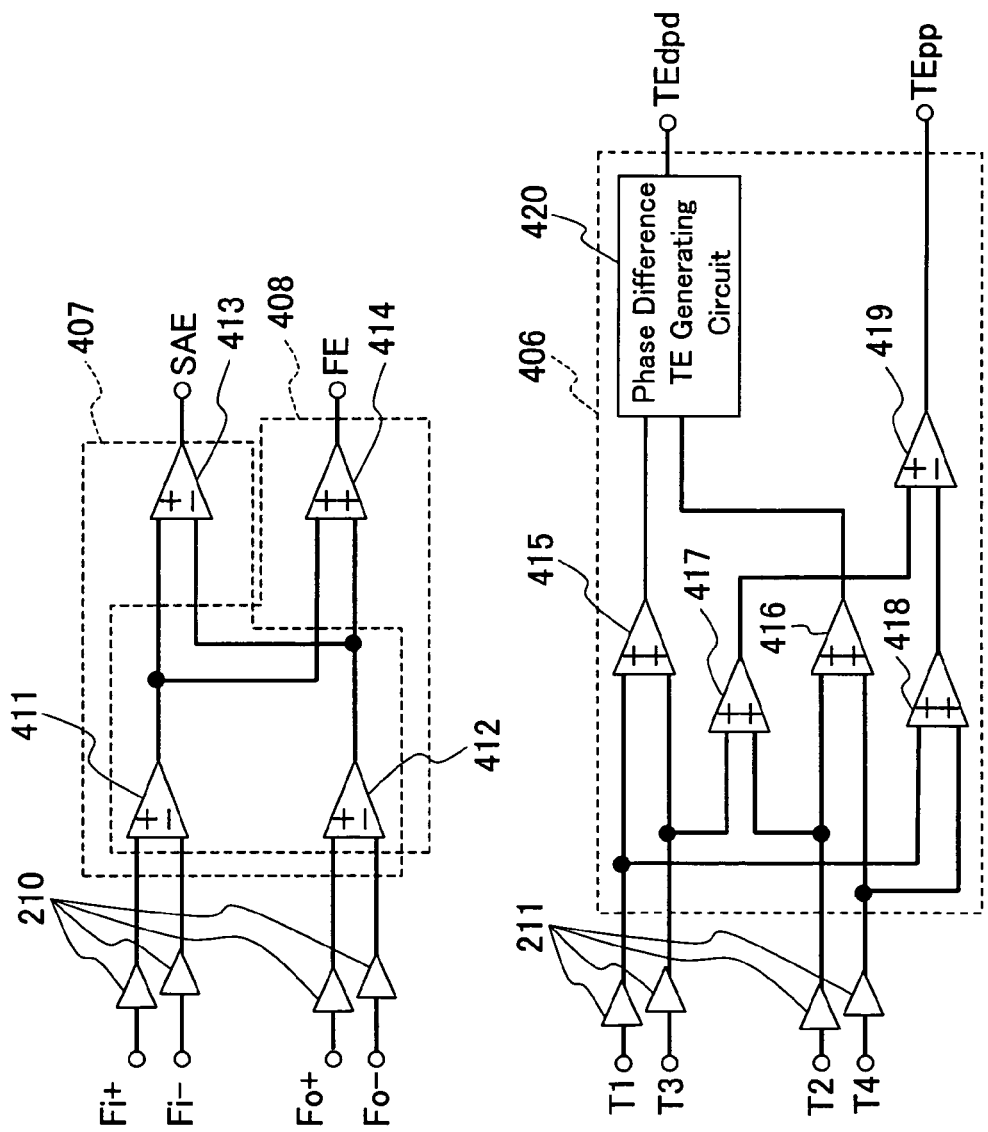
FIG. 25 is a view showing a configuration of a photodetector 309 and a configuration of the peripheral circuit thereof in the fifth embodiment.

FIG. 25 shows a configuration of the TE signal generation circuit 406, SAE signal generation circuit 407 and FE signal generation circuit 408. Fi+ signal, Fi−signal, Fo+ signal and Fo−signal are converted into voltage signals by the four current-voltage conversion circuits 210. The current-voltage conversion circuit 210 herein has a configuration shown in FIG. 4A. The differential circuit 411 receives Fi+ signal and Fi−signal and outputs the difference signal therebetween. The differential circuit 412 receives Fo+ signal and Fo−signal and outputs the difference signal therebetween. The differential circuit 413 receives the output signals from the differential circuits 411 and 412 and outputs the difference signal therebetween. This is the SAE signal. An adder 414 receives the output signals from the differential circuits 411 and 412 and outputs a sum signal thereof. This is a FE signal. The differential circuits 411, 412 and 413 form the SAE signal generating circuit 407.

T1, T2, T3 and T4 signals are converted into voltage signals by four current-voltage conversion circuits 211. The current-voltage conversion signal herein has a configuration shown in FIG. 4B. An adder 415 receives the T1 signal and T3 signal and outputs a sum signal thereof. The adder 416 receives the T2 signal and T4 signal and outputs a sum signal thereof. A phase difference TE generating circuit 420 receives the output signals from the adders 415 and 416, compares their phases with each other and generates a phase difference TE signal (TE dpd).

Furthermore, an adder 417 receives T3 signal and T2 signal and outputs a sum signal thereof and an adder 418 receives T1 signal and T4 signal and outputs a sum signal thereof. A differential circuit 419 receives output signals from the adders 417 and 418 and outputs the difference signal therebetween. The output signal from the differential circuit 419 becomes a push-pull tracking error signal (TE pp).

Also in this embodiment, it is possible to obtain a spherical aberration error signal with the SN ratio of the RF signal secured. In this configuration, spherical aberration and a focus error signal are detected by using the same beam. Therefore, it is possible to reduce the number of optical parts such as the hologram element, and thus to manufacture an optical head apparatus at low cost.

The case where the phase difference TE signal (TE dpd) and push-pull tracking error signal (TE pp) are generated as a tracking error signal is explained. However, one of the signals may be generated as a tracking error signal.

(Sixth Embodiment)

In a sixth embodiment of the present invention, a method is provided for directly receiving light reflected from an optical disk as an information storage medium, and dividing the light into an inner disklike portion and outer circumferential portion by the detection regions of the photodetector, and then obtaining the spherical aberration error signal.

Figure 26:
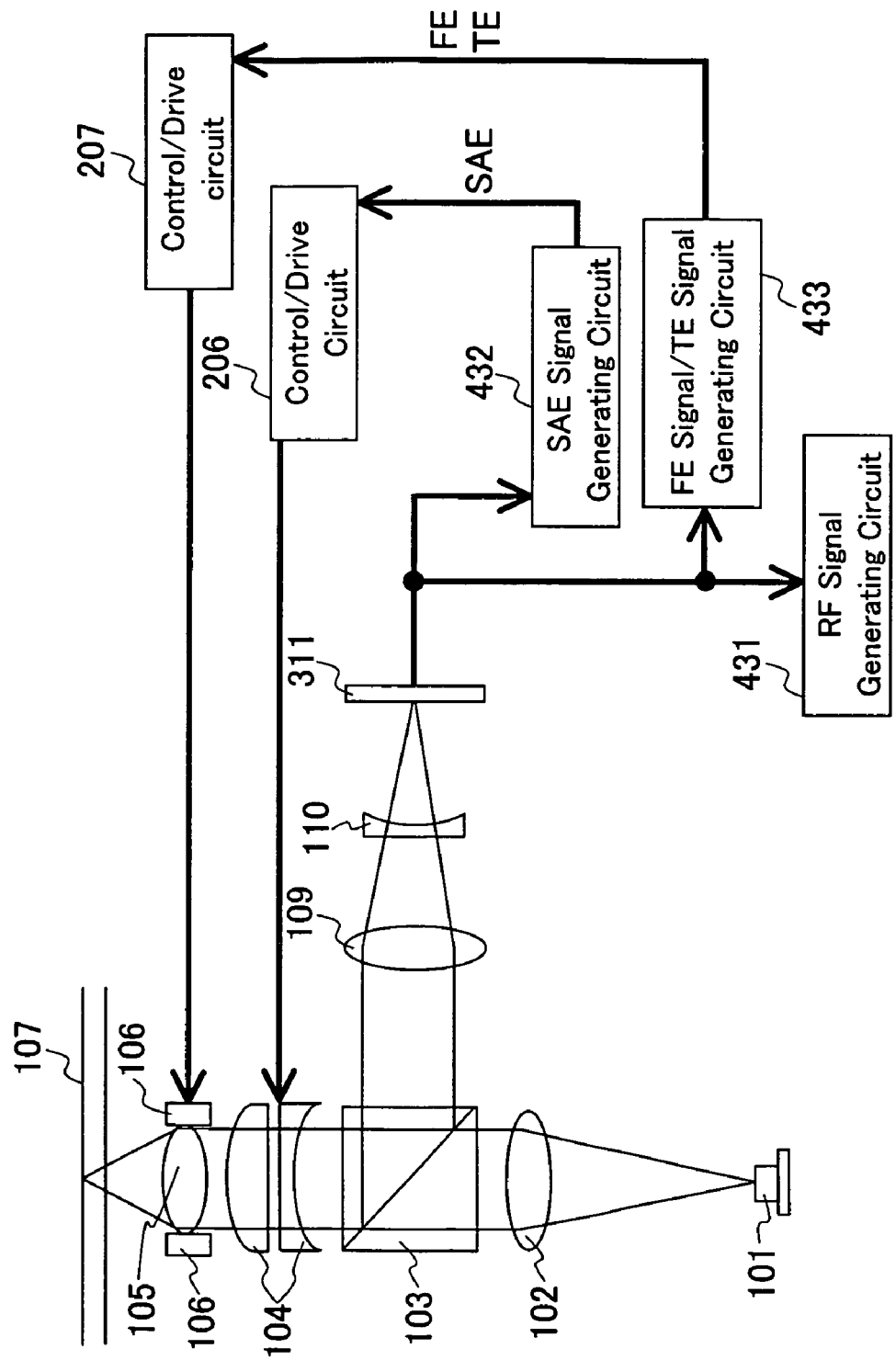
FIG. 26 is a view showing a configuration of an optical system and a circuit block diagram in an optical head apparatus according to a sixth embodiment of the present invention.

FIG. 26 shows a configuration of an optical head apparatus according to the sixth embodiment of the present invention. The explanation of the similar portions to the first embodiment is omitted herein. In FIG. 26, a cylindrical lens 110 is provided between the detection lens 109 and the photodetector 311, thereby giving astigmatic aberration in the 45-degree direction with respect to a track. The signal output from the photodetector 311 is input to a RF signal generating circuit 431, a FE signal/TE signal generating circuit 433 and a SAE signal generating circuit 432.

Figure 27:
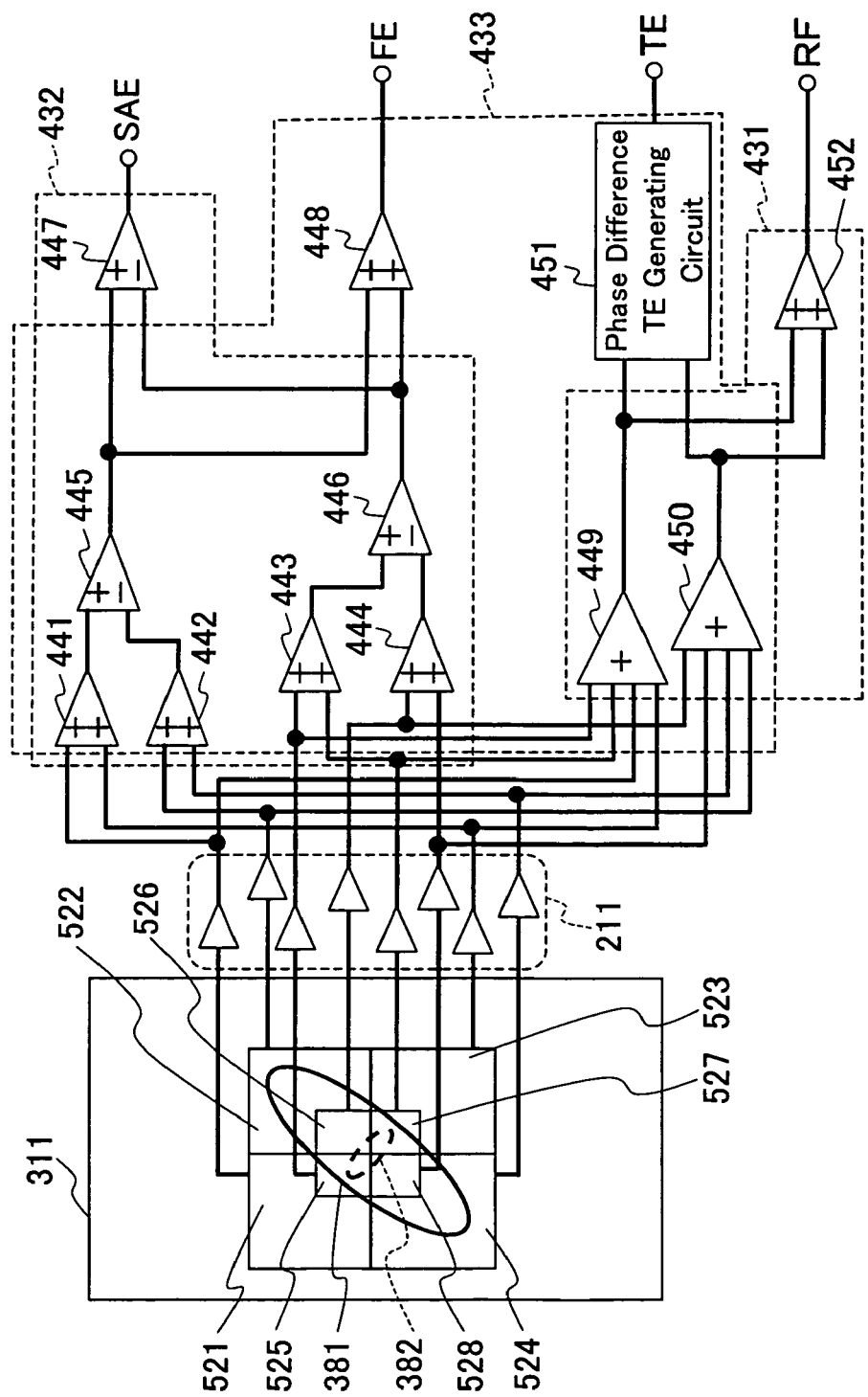
FIG. 27 is a view showing an arrangement of beams, a configuration of a photodetector 311 and a configuration of the peripheral circuit thereof in the sixth embodiment.
Figure 28:
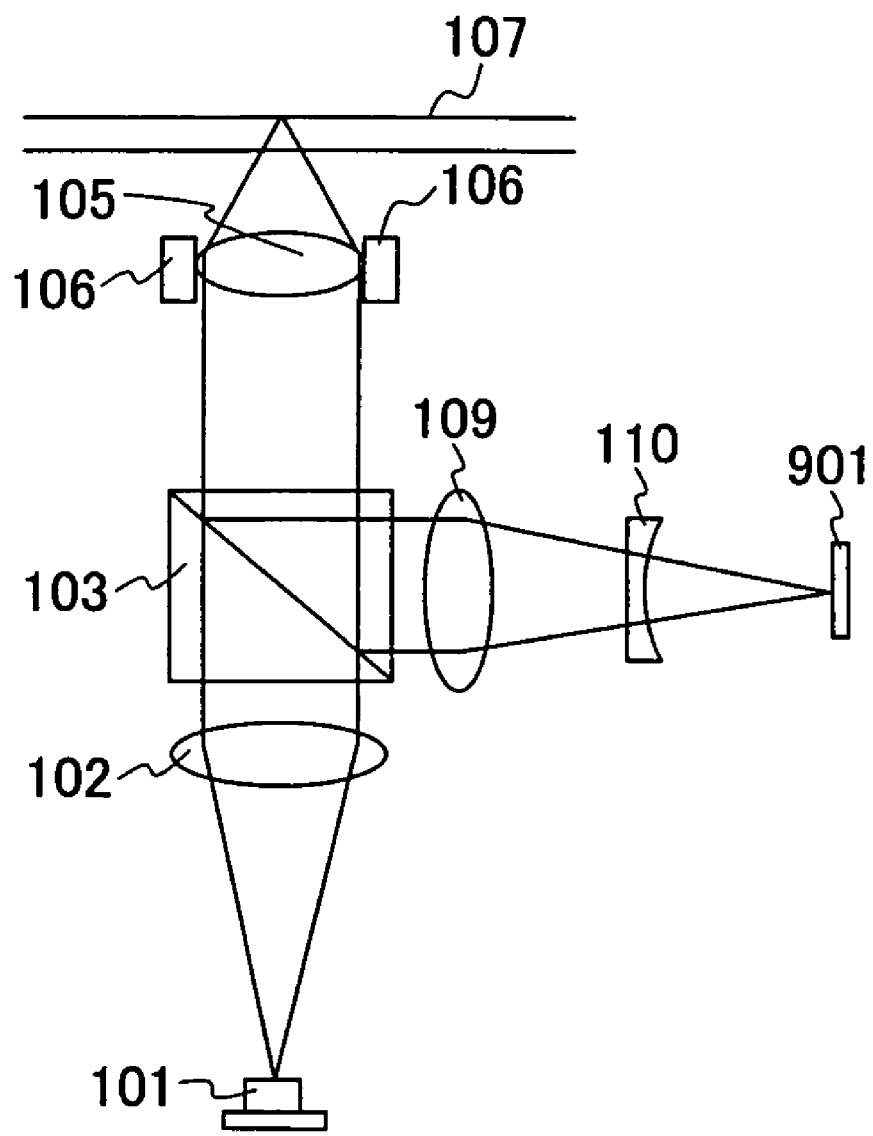
FIG. 28 is a view showing a configuration of an optical system in a conventional optical head apparatus.
Figure 29:
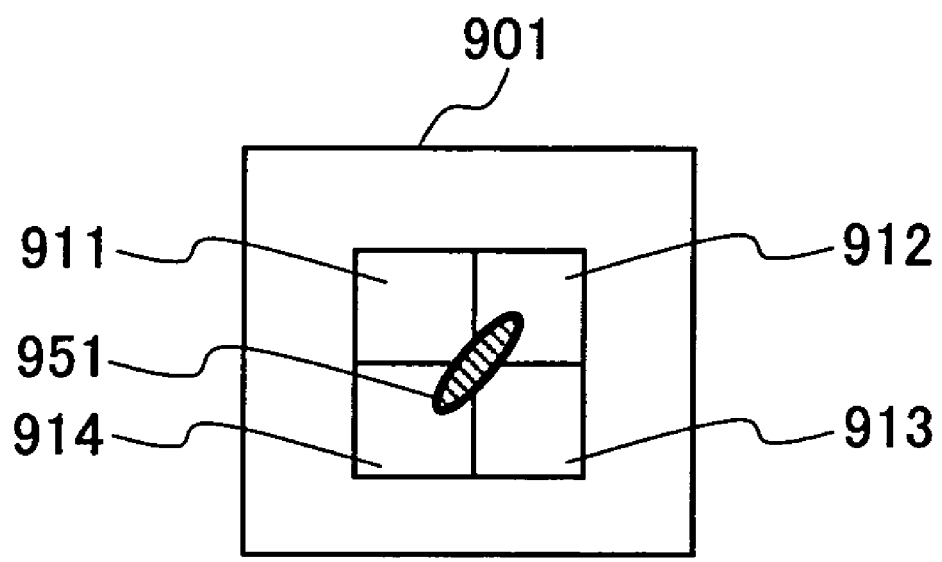
FIG. 29 is a view showing a configuration of a photodetector 901 shown in FIG. 28 and an arrangement of a beam.

FIG. 27 shows a front view of a photodetector 311, the arrangement of beams and a configuration of the peripheral circuit of the photodetector 311. The detection region of the photodetector 311 has double detection regions each divided into an upper left region, an upper right region, a lower right region and a lower left region. That is, the detection region of the photodetector 311 is divided into eight regions 521, 522, 523, 524, 525, 526, 527 and 528. Current signals output from these detection regions are converted into voltage signals by current-voltage conversion circuits 211. An adder 441 receives output signals from the detection regions 521 and 523 and outputs a sum signal thereof. An adder 442 receives output signals from the detection regions 522 and 524 and outputs a sum signal thereof. An adder 443 receives output signals from the detection regions 525 and 527 and outputs a sum signal thereof. An adder 444 receives output signals from the detection regions 526 and 528 and outputs a sum signal thereof.

A differential circuit 445 receives output signals from the adder 441 and adder 442 and outputs the difference signal therebetween. A differential circuit 446 receives output signals from the adder 443 and adder 444 and outputs the difference signal therebetween. A differential circuit 447 receives output signals from the adder 445 and adder 446 and outputs the difference signal therebetween. This is a spherical aberration (SAE) signal. An adder 448 receives the output signals from the differential circuit 445 and the differential circuit 446 and outputs a sum signal thereof. This is a focus error (FE) signal.

An adder 449 receives output signals from the detection regions 521, 525, 523 and 527 and outputs a sum signal thereof An adder 450 receives output signals from the detection regions 522, 526, 524 and 528 and outputs a sum signal thereof. A phase difference TE generating circuit 451 receives the output signals from the adders 449 and 450, compares their phases with each other and generates the phase difference TE signal. An adder 452 receives the output signals from the adders 449 and 450 and outputs a sum signal thereof. This is a RF signal.

Three adders 449, 450 and 452 form the RF signal generating circuit 431. The adders 441 to 444 and the differential circuits 445 to 447 form the SAE signal generating circuit 432. The adders 441 to 444, the differential 445 and 446, the adders 448, 449 and 450 and the phase difference TE signal generating circuit 451 form the FE signal/TE signal generating circuit 433.

A beam provided with astigmatic aberration in the 45-degree direction has an elliptical shape such as, for example, a beam 381. When spherical aberration occurs and focus deviation occurs between the inner disklike region near the optical axis and the outer circumferential region distant from the optical axis, the beam in the inner disklike region has an elliptical shape like a beam 382 shown in FIG. 27 whose shape is in the opposite direction to the shape of the beam 381. Therefore, it is possible to detect spherical aberration by double regions having double regions each divided into an upper left region, upper right region, a lower right region and a lower left region.

In this embodiment, since the number of the detection regions is increased, the number of amplifiers necessary for reproducing the RF signal is increased. However, since light is not divided by the hologram element, etc., loss of light can be minimized and the SN ratio can be maintained at a high level.

Furthermore, a dividing means for dividing light is not necessary, and thus the optical head apparatus can be manufactured at low cost.

As mentioned above, the present invention provides an advantageous effect of recording and reproducing signal stably with respect to an information storage medium with a high density.

Furthermore, an advantageous effect of realizing an optical information processing apparatus capable of reproducing information from the high density information storage medium with a low error rate is obtained.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical head apparatus comprising:
a light source for emitting light;
a converging optical system comprising a light converging means for converging the light emitted from the light source onto an information storage medium;
a light dividing means for dividing a returning light reflected by the information storage medium into a first light with a larger amount of light end a second light with an amount of light smaller than the amount of the first light;
a first photo detector for receiving the first light and outputting a signal that is sufficient itself to reproduce information recorded on the information storage medium; and
a second photo detector for receiving the second light and outputting a signal to detect aberration of light converged on the information storage medium.

2. The optical head apparatus according to claim 1, wherein the light dividing means divides the second light into light in a first region near the optical axis and light in a second region distant from the optical axis; and
the optical head apparatus comprises a spherical aberration detecting means for detecting the amount of spherical aberration of light converged on the information storage medium by using at least one of an amount of focus deviation of light in the first region and an amount of focus deviation of light in the second region.

3. The optical head apparatus according to claim 2, wherein the spherical aberration detecting means detects the difference between the amount of focus deviation of light in the first region and the amount of focus deviation of light in the second region as a spherical aberration amount.

4. The optical head apparatus according to claim 2, wherein a cross sectional shape of light used for the converging optical system is substantially circular with a first radius, and a first region that is a concentric circle of the substantial circle and has a second radius smaller than the first radius and a second region that is outside of the first region and inside of the substantial circle with the first radius are provided.

5. The optical head apparatus according to claim 2, wherein the amount of change in the amount of focus deviation of light in the first region is equal to that in the amount of focus deviation of light in the second region when the relative distance between the information storage medium and the light converging means varies.

6. The optical head apparatus according to claim 2, wherein the second photo detector has a first photo detection region for detecting light in the first region and a second photo detection region for detecting light in the second region; and the first photo detection region is arranged in a portion nearer to the optical axis of the first light divided by the light dividing means as compared with the second photo detection region.

7. The optical head apparatus according to claim 2, wherein the converging optical system comprises a spherical aberration correcting means for changing spherical aberration of light converged on the information storage medium, and the spherical aberration correcting means operates by receiving a signal from the spherical aberration detecting means.

8. The optical head apparatus according to claim 1, wherein the information storage medium has tracks with a certain pitch,
the light dividing means divides a region in which the +first order light and the zero order light diffracted by the tracks are overlapped into an inner region +1A and an outer region +1B surrounding the region +1A, and divides a region in which the −first order light and the zero order light diffracted by the tracks are overlapped into an inner region −1A and an outer region −1B surrounding the region −1A; and the optical head apparatus further comprises a tilt detecting means for detecting an amount of tilt toward the direction of tracks between the information storage medium and the converging optical system on the basis of a difference signal between a signal RT+ and a signal −RT, wherein the signal RT+ is a sum signal of signals in proportion to the amount of light in the region +1A and signals in proportion to the amount of light in the region −1B, and the signal RT− is a sum signal of signals in proportion to the amount of light in the region +1B and signals in proportion to the amount of light in the region −1A.

9. An optical head apparatus comprising:

a light source for emitting light;

a converging optical system comprising a light converging means for converging the light emitted from the light source onto an information storage medium;

a light dividing means for dividing a returning light reflected by the information storage medium into light in the first region near the optical axis and light in the second region distant from the optical axis and, one photo detector for receiving the divided light; wherein:

when the difference between the amount of focus deviation of light in the first region and the amount of focus deviation of light in the second region are used to detect a spherical aberration amount of light converged on the information storage medium, the amount of change in the amount of focus deviation of light in the first region is equal to that in the amount of focus deviation of light in the second region when the relative distance between the information storage medium and the light converging means varies.

10. The optical head apparatus according to claim 9, wherein the cross sectional shape of light used for the converging optical system is substantially circular, and when the radius of the substantial circle is a first radius Rb, the first region is a region that is a concentric circle of the substantial circle and has a second radius Rb1 being smaller than the first radius Rb, and the second region is a region that is outside of the first region and inside of the substantial circle with the first radius, when the relative distance between the information storage medium and the light converging means varies, the ratio of the first radius Rb to the second radius R1 is determined so that the amount of change in the amount of focus deviation of light in the first region is equal to that in the amount of focus deviation of light in the second region.

11. An optical head apparatus comprising:

a light source for emitting light;

a sub-beam generating means for generating a sub-beam from light emitted from the light source;

a converging optical system comprising a light converging means for converging the sub-beam and a main beam other than the sub-beam onto an information storage medium;

a light dividing means for dividing a returning light reflected by the information storage medium into a first light with a larger amount of light and a second light with an amount of light smaller than the amount of the first light;

a first photo detector for receiving the first light and outputting a signal to reproduce information recorded on the information storage medium;

a second photo detector for receiving a second light and outputting a signal to detect aberration of the light converged on the information storage medium; and a third photo detector for detecting a returning sub-beam reflected by the information storage medium; wherein the second photo detector and the third photo detecting means are arranged in the direction substantially perpendicular to the first photo detector.

12. An optical head apparatus comprising:

a light source for emitting light;

a converging optical system comprising a light converging means for converging the light emitted from the light source onto an information storage medium;

a light dividing means for dividing a returning light reflected by the information storage medium into a first light with a larger amount of light and a second light with an amount of light smaller than the amount of the first light;

a first photo detector for receiving the first light and outputting a signal to reproduce information recorded on the information storage medium;

a second photo detector for receiving the second light and outputting a signal to detect aberration of the light converged on the information storage medium; and a judgment means for judging that a distance between the information storage medium and the converging optical means is in a certain range on the basis of a sum signal of signals from the first photo detector and the second photo detector.

13. An optical head apparatus comprising:

a light source for emitting light;

a converging optical system comprising a light converging means for converging the light emitted from the light source onto an information storage medium;

a light dividing means for dividing a returning light reflected by the information storage medium into a first light with a larger amount of light and a second light with an amount of light smaller than the amount of the first light;

a first photo detector for receiving the first light and outputting a signal to reproduce information recorded on the information storage medium; and a second photo detector for receiving the second light and outputting a signal to detect aberration of the light converged on the information storage medium; wherein the area of the detection region of the second photo detector S1 satisfies the following relationship:

$$S1 \leq 4\cdot\pi\cdot(d\cdot NA\cdot\alpha)^2\cdot\eta s/\eta m;$$

wherein $\eta m$ denotes an amount of the first ligh; $\eta s$ denotes an amount of the second light; NA denotes a numerical aperture of the converging optical system; $\alpha$ denotes a lateral magnification of the returning path from the information storage medium to the first and second photo detectors of the converging optical system; and d denotes an optical interval between two reflection surfaces of the information storage medium having a plurality of reflecting surfaces.

14. An information recording and reproducing apparatus comprising an optical head apparatus comprising a light source for emitting light; a converging optical system comprising a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light and outputting a signal that is sufficient itself to reproduce information recorded on the information storage medium; and a second photo detector for receiving the second light and outputting a signal to detect aberration of the light converged on the information storage medium;

a movement means for relatively moving the optical head apparatus and the information storage medium; and a control means for controlling the optical head apparatus and the movement means.

15. A method for detecting aberration, using:

a light source for emitting light; a converging optical system comprising a light converging means for converging the light emitted from the light source onto an information storage medium; a light dividing means for dividing a returning light reflected by the information storage medium into a first light with a larger amount of light and a second light with an amount of light smaller than the amount of the first light; a first photo detector for receiving the first light and outputting a signal that is sufficient itself to reproduce information recorded on the information storage medium; and a second photo detector for receiving the second light and outputting a signal to detect aberration of the light converged on the information storage medium; wherein the method reproduces information recorded on the information storage medium by using a signal from the first photo detector and detects aberration of light converged on the information storage medium by using signal from the second photo detector.

* * * * *

UNITED STATES PATENT AND TRADEMARK OFFICE
CERTIFICATE OF CORRECTION

PATENT NO. : 6,967,916 B2
DATED : November 22, 2005
INVENTOR(S) : Sano et al.

It is certified that error appears in the above-identified patent and that said Letters Patent is hereby corrected as shown below:

Column 26,
Line 6, "light end" should read -- light and --.

Signed and Sealed this

Twenty-third Day of May, 2006

JON W. DUDAS
*Director of the United States Patent and Trademark Office*